US008416988B2

(12) United States Patent
Matsumoto et al.

(10) Patent No.: US 8,416,988 B2
(45) Date of Patent: Apr. 9, 2013

(54) SYSTEMS AND METHODS FOR ANALYZING FACIAL EXPRESSIONS, IDENTIFYING INTENT AND TRANSFORMING IMAGES THROUGH REVIEW OF FACIAL EXPRESSIONS

(76) Inventors: David Matsumoto, Oakland, CA (US); Paul Ekman, San Francisco, CA (US)

( * ) Notice: Subject to any disclaimer, the term of this patent is extended or adjusted under 35 U.S.C. 154(b) by 221 days.

(21) Appl. No.: 12/646,211

(22) Filed: Dec. 23, 2009

(65) Prior Publication Data
US 2011/0026779 A1 Feb. 3, 2011

Related U.S. Application Data

(60) Provisional application No. 61/203,592, filed on Dec. 24, 2008.

(51) Int. Cl.
*G06K 9/00* (2006.01)
*G08B 29/00* (2006.01)
(52) U.S. Cl. .................... 382/103; 382/118; 340/506
(58) Field of Classification Search .................. 382/103, 382/115, 118; 340/506
See application file for complete search history.

(56) References Cited

U.S. PATENT DOCUMENTS

| | | | | |
|---|---|---|---|---|
| 6,460,764 B1* | 10/2002 | Sakanashi et al. | ............ | 235/380 |
| 7,027,054 B1* | 4/2006 | Cheiky et al. | ................. | 345/473 |
| 8,208,764 B2* | 6/2012 | Guckenberger | .............. | 382/305 |
| 2002/0023952 A1* | 2/2002 | Sakanashi et al. | ............ | 235/380 |
| 2005/0244798 A1 | 11/2005 | Zernzach | | |
| 2007/0122003 A1* | 5/2007 | Dobkin et al. | ................ | 382/115 |
| 2007/0189584 A1* | 8/2007 | Li | .................................. | 382/118 |
| 2009/0097713 A1* | 4/2009 | DeLean | ........................ | 382/115 |
| 2009/0226044 A1* | 9/2009 | Ngan et al. | .................... | 382/115 |
| 2009/0285456 A1* | 11/2009 | Moon et al. | ................... | 382/118 |

FOREIGN PATENT DOCUMENTS

WO 03/031711 A1 6/2000

OTHER PUBLICATIONS

Elfenbein, Hillary Anger, et al; "Toward a Dialect Theory: Cultural Differences in the Expression and Recognition of Posed Facial Expressions"; Emotion (Washington D.C.) vol. 7, No. 1, Feb. 2007; pp. 131-146.
Matsumoto, David, et al; "Chapter 13: Facial Expressions of Emotion"; II. Biological and Neurophysiological Approaches; "Handbook of Emotions" Guilford Press.; Apr. 2008; pp. 211-234.

* cited by examiner

*Primary Examiner* — Brian Le
(74) *Attorney, Agent, or Firm* — Squire Sanders (US) LLP

(57) ABSTRACT

Methods of analyzing a plurality of facial expressions are disclosed that include: identifying a subject person, utilizing the subject person to create an image of a known target, removing at least one distracter expression from the target image to form a revised target image, and reviewing the revised target image with at least one third party participant to form a final target image. Additional methods of analyzing a plurality of facial expressions include: identifying a subject person, utilizing the subject person to create an image of a known target, digitizing the target image, removing at least one distracter expression from the target image to transform the target image to a revised target image, and reviewing the revised target image with at least one third party participant to transform the revised target image to a final target image. Software for implementing contemplated methods include: a set speed function, a pre-test phase function, an instruction phase function, a practice phase function, and a post-test phase function.

22 Claims, 11 Drawing Sheets

Fig. 8

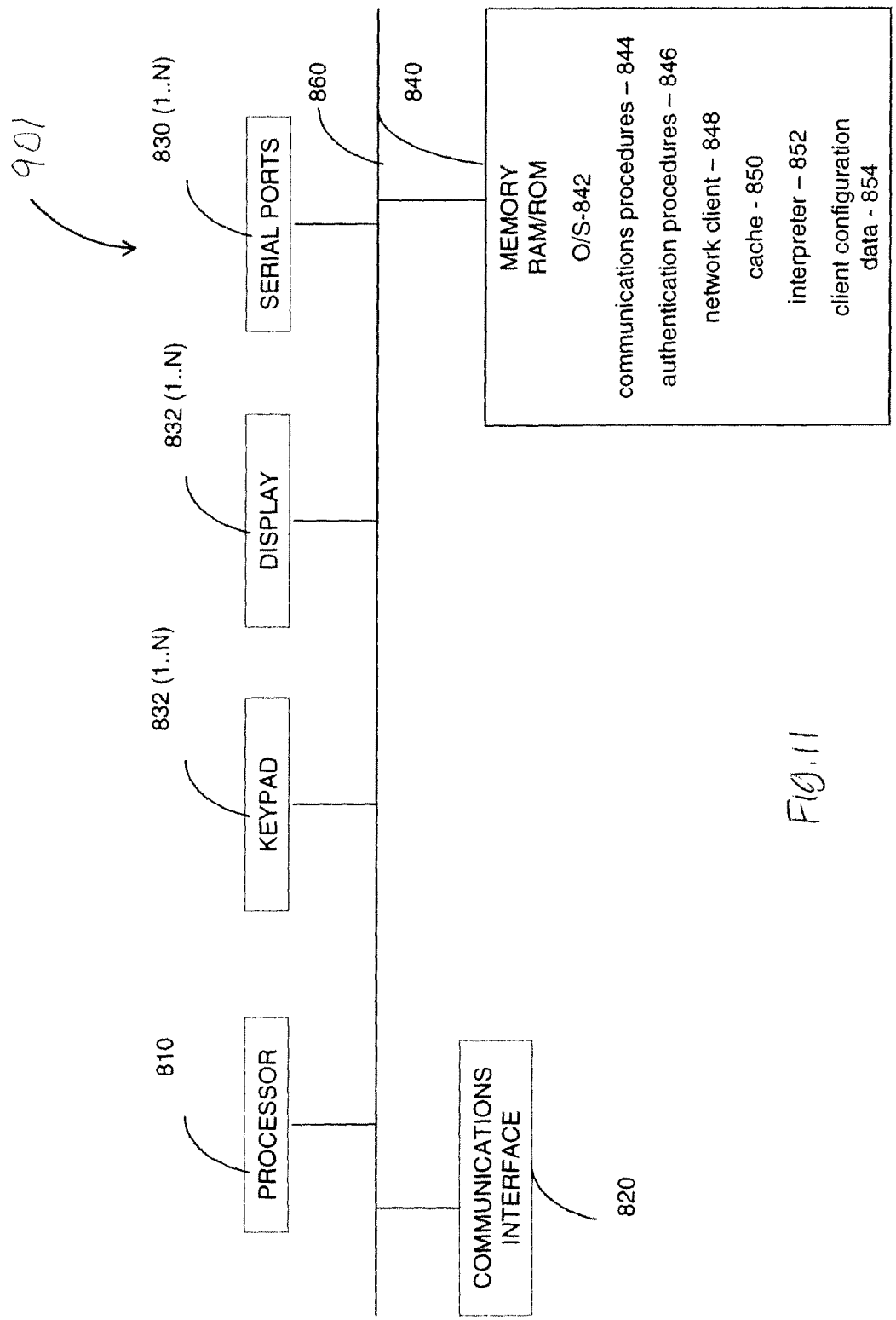

SYSTEMS AND METHODS FOR ANALYZING FACIAL EXPRESSIONS, IDENTIFYING INTENT AND TRANSFORMING IMAGES THROUGH REVIEW OF FACIAL EXPRESSIONS

This U.S. Utility Application claims priority to U.S. Provisional Application Ser. No. 61/203,592 filed on Dec. 24, 2008, which is commonly owned and incorporated herein in its entirety.

FIELD OF THE SUBJECT MATTER

The field of the subject matter relates generally to systems and methods for identifying the intent of an individual through facial expressions, and more particularly to systems and methods for identifying deadly or dangerous intent through facial expressions before a premeditated or loss of impulse control assault.

BACKGROUND

Reading people well, building rapport, deducing information and eliciting response are crucial skills in today's society for anyone who interacts with the public. Interactive training is the most effective way to improve this skill set. Studies show that there is a high agreement about the specific nature of facial expressions that are visible in the moments before either a premeditated physical assault, or an assault due to a momentary loss of impulse control. It has also been noted that premeditated and impulsive assault expressions are very different.

While it is understood that facial expressions may vary with the intent of an individual, there are no conventional methods, systems or software to quantify or qualify exactly what these expressions are or how an individual may be able identify facial expressions. Contemplated embodiments provide novel systems and methods to create facial expression images and automate technology to scan for the presence of facial expressions associated with violent and dangerous behavior, and in particular those facial expressions associated with deadly intent. Such systems and methods therefore provide a few seconds warning to those in heightened danger. Furthermore, contemplated embodiments also provide novel systems and methods to train those in harms way to be alerted to deadly intent facial expressions to scan for the presence of deadly intent.

SUMMARY

Methods of analyzing a plurality of facial expressions are disclosed that include: identifying a subject person, utilizing the subject person to create an image of a known target, removing at least one distracter expression from the target image to form a revised target image, and reviewing the revised target image with at least one third party participant to form a final target image.

Additional methods of analyzing a plurality of facial expressions include: identifying a subject person, utilizing the subject person to create an image of a known target, digitizing the target image, removing at least one distracter expression from the target image to transform the target image to a revised target image, and reviewing the revised target image with at least one third party participant to transform the revised target image to a final target image.

Software for implementing contemplated methods include: a set speed function, a pre-test phase function, an instruction phase function, a practice phase function, and a post-test phase function.

BRIEF DESCRIPTION OF THE FIGURES

FIG. 8 shows a contemplated screen shot for a contemplated embodiment where the score is presented.

FIG. 11 is a block diagram of the client computer shown in FIG. 9.

DETAILED DESCRIPTION

Figure 1:
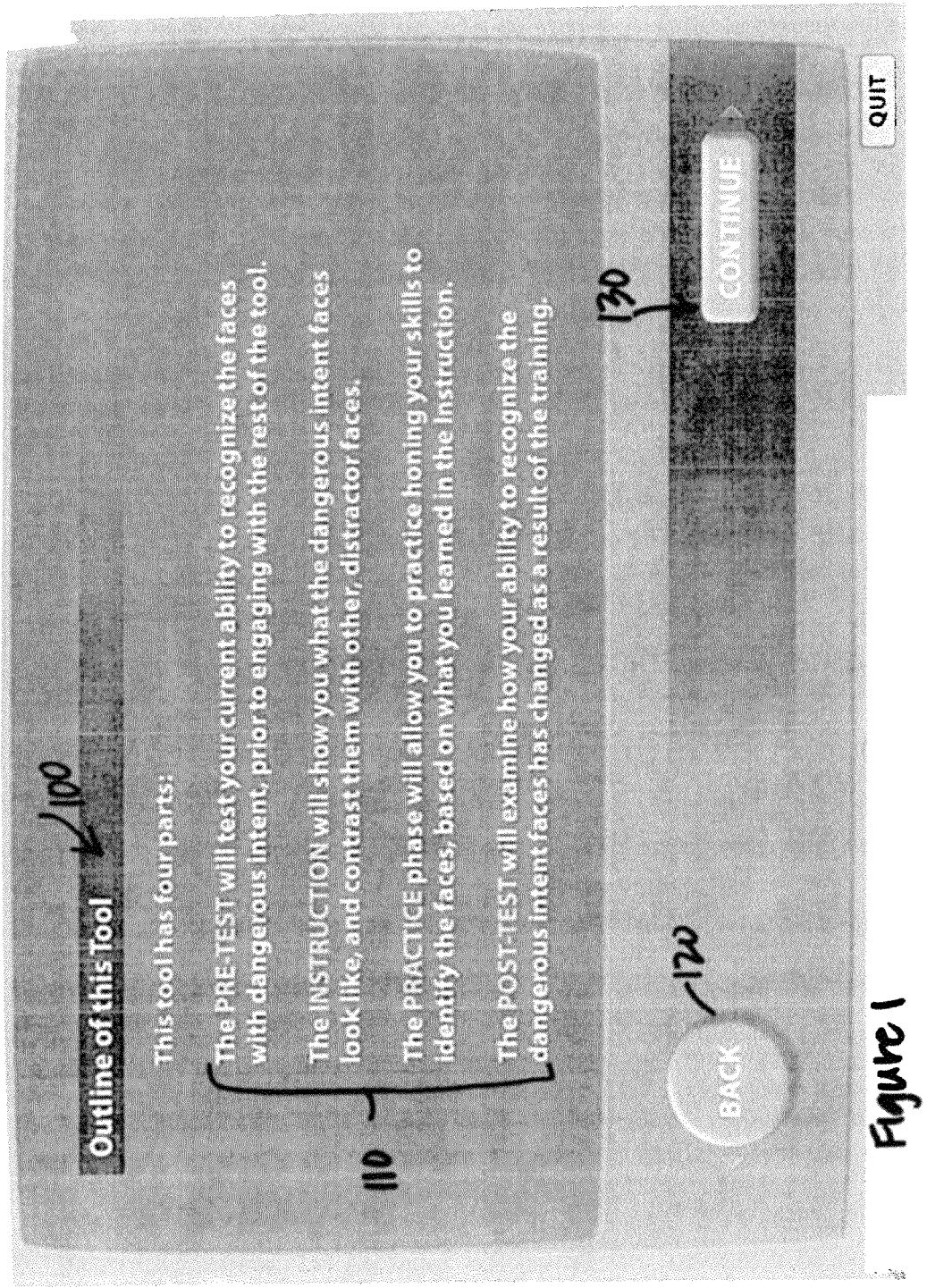
FIG. 1 shows a contemplated screen shot for a contemplated embodiment where the outline of the tool is presented.

Methods of analyzing a plurality of facial expressions are disclosed that include: identifying a subject person, utilizing the subject person to create an image of a known target, removing at least one distracter expression from the target image to form a revised target image, and reviewing the revised target image with at least one third party participant to form a final target image. Additional methods of analyzing a plurality of facial expressions include: identifying a subject person, utilizing the subject person to create an image of a known target, digitizing the target image, removing at least one distracter expression from the target image to transform the target image to a revised target image, and reviewing the revised target image with at least one third party participant to transform the revised target image to a final target image. Software for implementing contemplated methods include: a set speed function, a pre-test phase function, an instruction phase function, a practice phase function, and a post-test phase function.

Contemplated embodiments disclose systems and methods for identifying dangerous intent based upon facial expressions. As will be appreciated by one of skill in the art, contemplated systems and methods disclosed are equally applicable to the identification of facial expressions disclosing other characteristics and intent. Research shows that specific facial expressions are associated with an impending attack. While such expression are not an absolute certainty, there is reasonable probability to associate certain facial expressions with specific physically responses. The purpose of identifying a particular facial expression with a particular intent is to alert an individual of the need to be more attentive to the individual displaying the facial expression. It may also alert the person to prepare to respond or take a preemptive action. While there is no certainty that any facial expression will necessarily precede a dangerous action, the ability to identify and be aware of such physical manifestations is beneficial.

In contemplated embodiments, images are created to display anger intent facial expressions. This creation of images is unique from present systems where images are created and then individuals classify the images. In contemplated embodiments, instead of showing a set of faces and asking people to pick the one they saw before a deadly assault, the target images are created by having people who have recently been assaulted create the face they saw, converted into revised target images and then transformed into final target images. This novel approach is an operative concept of contemplated embodiments because there is no absolute certainty in the facial expressions that may appear. This active creation step by contemplated users and third party participants is particularly important when trying to characterize facial expressions of people of varying cultures, such as a terrorist or extremist. These contemplated methods are significant in that the contemplated systems are relevant in worldwide applications. Furthermore, contemplated embodiments may assist a traveling individual in being cognitive of cultural differences.

revised target image may be confirmed multiple times by one or more third party participants. One reason for the multiple confirmations is to ensure any cultural bias is removed. The images may also be shown to and confirmed by people within the cultural group from which the expression was created.

Once a final target image is created, the image may be used to analyze and compare it to images obtained through other sources. Such analysis may be performed by scanning the created image and identifying key features as discussed below that depict dangerous intent. These identified features are then compared with at least one image obtained through other sources. Contemplated comparisons may be done manually, automatically or through a combination thereof, as will be described herein.

In contemplated embodiments, facial expressions may be analyzed by evaluating the movement of facial muscles. In this novel approach specific muscular groups are associated with particular intent. The intensity, or amount of muscle movement, may effect the evaluation of the expression. Table 1 below shows a contemplated analysis.

TABLE 1

| Expression | Facial Action Coding System U | Muscle name | Intensity level |
| --- | --- | --- | --- |
| Premeditated Assault | 4 | Corrugator supercilii, Depressor supercilii | A-C |
| | 5 | Levator palpebrae superioris | A-C |
| | 7 | Orbicularis oculi, pars palpebralis | A-B |
| | 23 | Orbicularis oris | Top and/or bottom; AC; may or may not be present |
| | 17 | Mentalis | May or may not be present |
| Loss of Control, version 1 | 4 | Corrugator supercilii, Depressor supercilii | C-E |
| | 5 | Levator palpebrae superioris | C-E |
| | 7 | Orbicularis oculi, pars palpebralis | A-B: may or may not be present |
| | 23 | Orbicularis oris | Top and/or bottom; A-D |
| | 26 | Jaw drop | |
| | Face reddening | | |
| Loss of Control, version 2 | 4 | Corrugator supercilii, Depressor supercilii | D-E |
| | 5 | Levator palpebrae superioris | C-E |
| | 7 | Orbicularis oculi, pars palpebralis | C-E |
| | 9 | Levator palpebrae superioris | C-E |
| | 20 | Risorius w/ platysma | C-E |
| | Face reddening Jaw clench | | |
| | 10 | Levator palpebrae superioris | May or may not be present |
| | 16 | Depressor Labii inferioris | May or may not be present |
| | 23 | Orbicularis oris | May or may not be present |
| | 21 | | May or may not be present |

The creation of dangerous intent facial expressions involves multiple steps. First, an individual who has been attacked, saw the facial expression of the attacker and can identify the expression is interviewed in order to create the target image. Then the individual is shown alternate images to ensure "distracter expressions" are removed from the created image to form a revised target image. As used herein, the phrase "distracter expressions" is used to refer to those expressions in alternate facial expression images that are not considered relevant or particularly helpful in identifying the dangerous intent.

Figure 9:
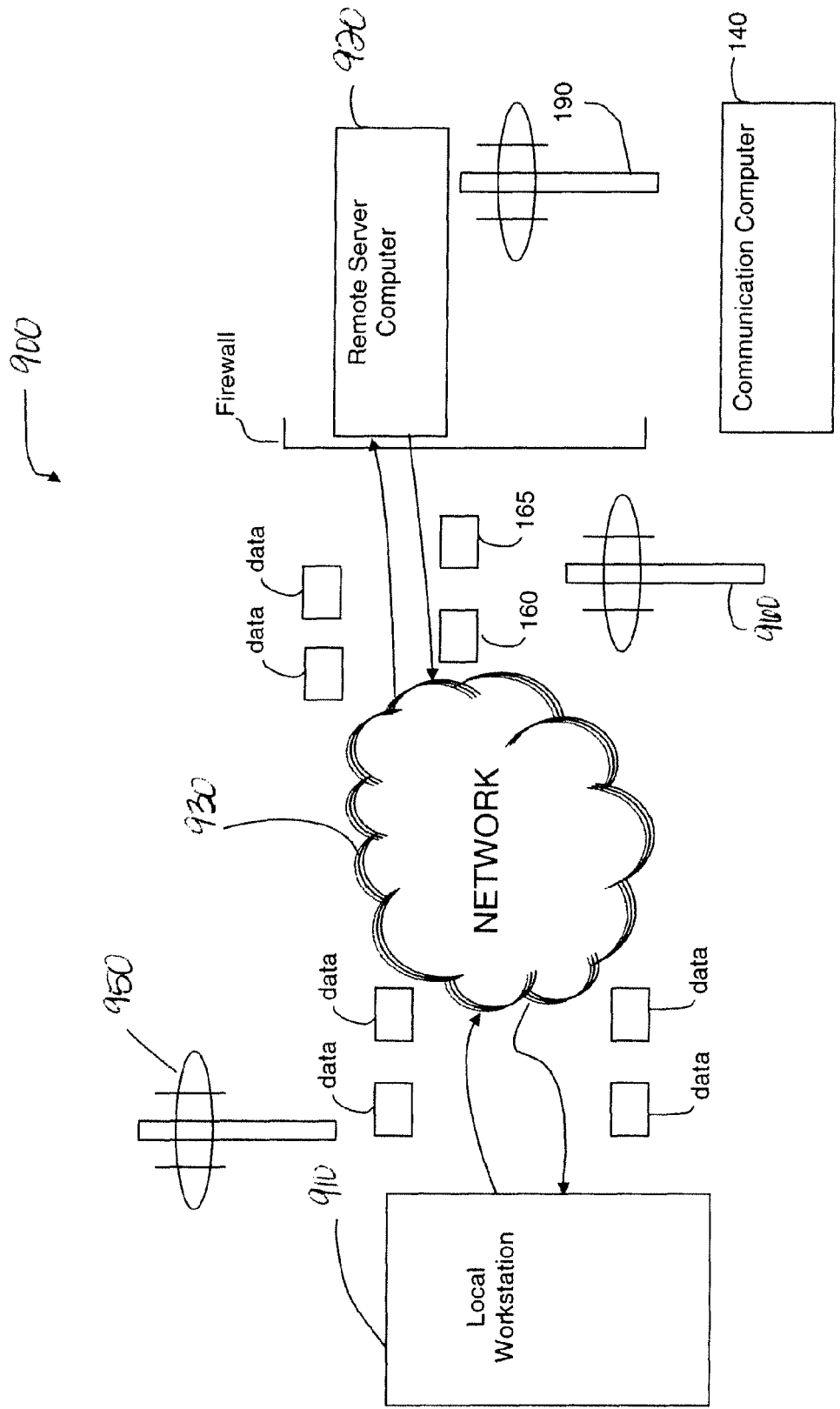
FIG. 9 is a block diagram illustrating a computer system in accordance with a contemplated embodiment.

Then, the created revised target image is shown to at least one third party participant who has experience in dealing with individuals from the particular cultural group who have perpetrated the particular type of attack. This created facial While contemplated disclosed methods and systems may be utilized through a manual process, in most embodiments, an automated, or software application is contemplated. FIG. 9 is an exemplary depiction of one such system 900. FIG. 9 is a block diagram of a system 900 for analyzing facial expressions via a network 920 from a remote device or client computer 910, then transforming and delivering the results to the remote device 910. The systems comprise a remote server 920 linked to a network 930. The network may be any suitable network, such as a Local Area Network (LAN), Wide Area Network (WAN), an Extranet, an Internet or a combination thereof. However, in a contemplated embodiment, the network 930 is the Internet. Although only one remote server is depicted, one skilled in the art will recognize that any number of remote servers may be utilized.

The network 930 is coupled to a client computer 910 through a communication link 950, such as a wireless connection, phone line, cable line, digital subscriber line, infrared link or the like. The client computer 910 includes any computing device that can couple to the network 930 via the communication line 950. The client computer 910 may be a personal computer, laptop computer, handheld, computer, mainframe computer, PDA, smartphone or the like, including a combination thereof.

Figure 10:
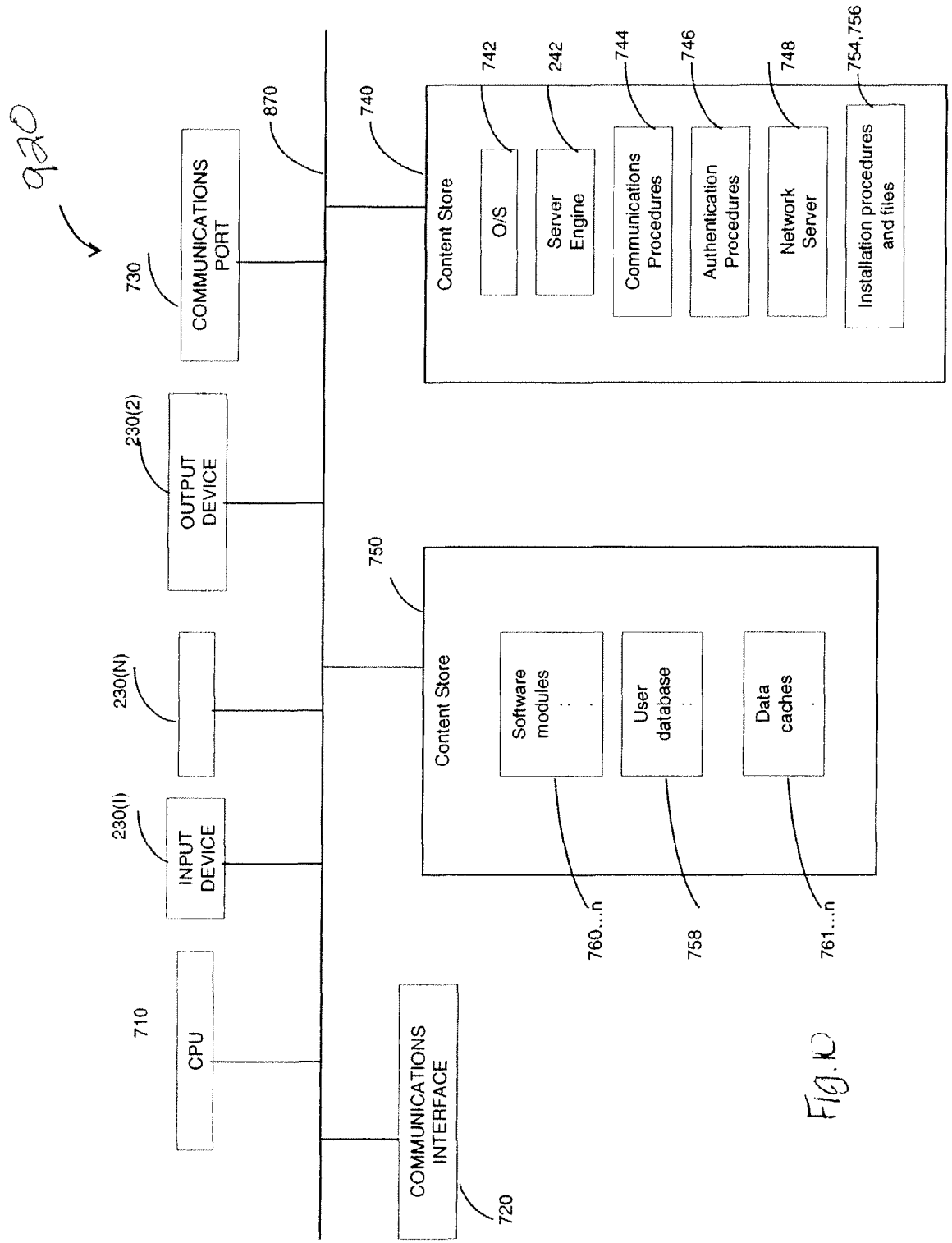
FIG. 10 is a block diagram of the remote server shown in FIG. 9.

FIG. 10 is a block diagram of the remote server 920 shown in FIG. 9. The remote server 920 contains a plurality of components such as at least one central processing unit (CPU) 710, communications circuitry 720, at least one communication port 730, a memory 740 and at least one bus 870 that connects the aforementioned components. The communications circuitry 720 and the communications port 730 preferably include one or more Network Interface Cards (NICs) configured to communicate with the network 930 and the client computer 910. The memory 740 preferably comprises Random Access Memory (RAM) and/or Read Only Memory (ROM). The memory 740 preferably includes an operating system 742 which has instructions for communicating, processing, accessing, storing, or searching data. Examples of suitable operating systems include MICROSOFT WINDOWS™, DOS™, UNIX™, LINUX™ and MACOS™. In addition, memory 740 preferably includes communication procedures 744, authentication procedures 746, a network server 748, content 750, an installation reference 752, installation procedures 754, installation files 756, a user database 758, one or more source directories 760 containing software and/or other data.

The communications procedures 744 are used for communicating with both the client computer 950 and the network 930. The authentication procedures 754, are used for authenticating users, such as through a username and password system. Successful completion of the authentication procedures gives users access to the installation files 756 on the server 920.

The network server 748 receives and delivers data between itself and the client computer 910. The network server 748 also executes server-side scripts (CGI scripts, JSPs, ASPs, etc.) that provide functions such as database searching. The content 750 is any information that is available for retrieval by the user, including Web-pages, images, music, audio, white papers, drivers, as well as training, educational and reference materials. The content 750 is not presented in a programming language but rather in a "presentation language." Examples of presentation languages include HTML, XML, XHTML and CGI.

The installation procedures 754 may be used to install fertilizer selection software onto the client computer 910.

FIG. 11 is a block diagram of client computer 910. Client computer 910 comprises a plurality of components, such as a central processing unit (CPU) 810; communications circuitry 820; ports 830(1)-(N), where port 1 is connected to network 650; input/output devices 832, such as a monitor and keyboard; a memory 840; and at least one bus 860 that connects the aforementioned components.

The memory 840 preferably includes an operating system 842, such as MICROSOFT WINDOWS™, DOS™, UNIX™, LINUX™ and MACOS™, which has instructions for communicating, processing, accessing, storing, and searching data. The memory 842 further preferably includes: communications procedures 844, authentication procedures 846, a network client 848, and a cache 850 for temporarily storing data. In use, the cache may contain an interpreter 852, and client computer configuration data 854.

Communications procedures 844 are used for communicating with the network 930. Authentication procedures 846 are used to authenticate a client computer's access to the remote server 920.

The network client 848 receives the content 750 from the remote server 920. The network client 920 may be a browser or similar type program, such as MICROSOFT'S INTERNET EXPLORER™ or NETSCAPE'S NAVIGATOR™.

Interpreter 852 is a high-level programming language translator that translates a program statement into machine language, executes it, and then proceeds to the next statement. In one embodiment, interpreter 852 creates parameter tags to the applet tag in content 750.

Installation procedures 754 are used to download and install facial expression intent software onto the client computer 910. The client computer configuration data 854 contains the client computer's configuration information, such as the hardware and software that makes up the client computer 910 (FIG. 9).

A user may access the training software by utilizing an automated system such as a web based program that is accessible through a network, by downloading software from a remote server to a client computer or by installing software from a disc, CD, DVD, or other storage media. For example, a user could access a web based program which would guide the user through each of the contemplated facial analysis training modules described above in conjunction with FIGS. 1-8 or alternatively, the user could download or install software on his local computer. Furthermore, the web-based or local based software could store answers, provide analysis of the user's progress, and provide feedback.

Contemplated embodiments provide for multiple steps in implementing the system. FIG. 1 shows a screenshot of a contemplated embodiment where the "OUTLINE OF THE TOOL" 100 is presented to the user, wherein a set of descriptions 110 are presented to the user (not shown). The user may choose to go "BACK" 120 to a previous screen (not shown) or "CONTINUE" 130 to the next screen (not shown).

Figure 2:
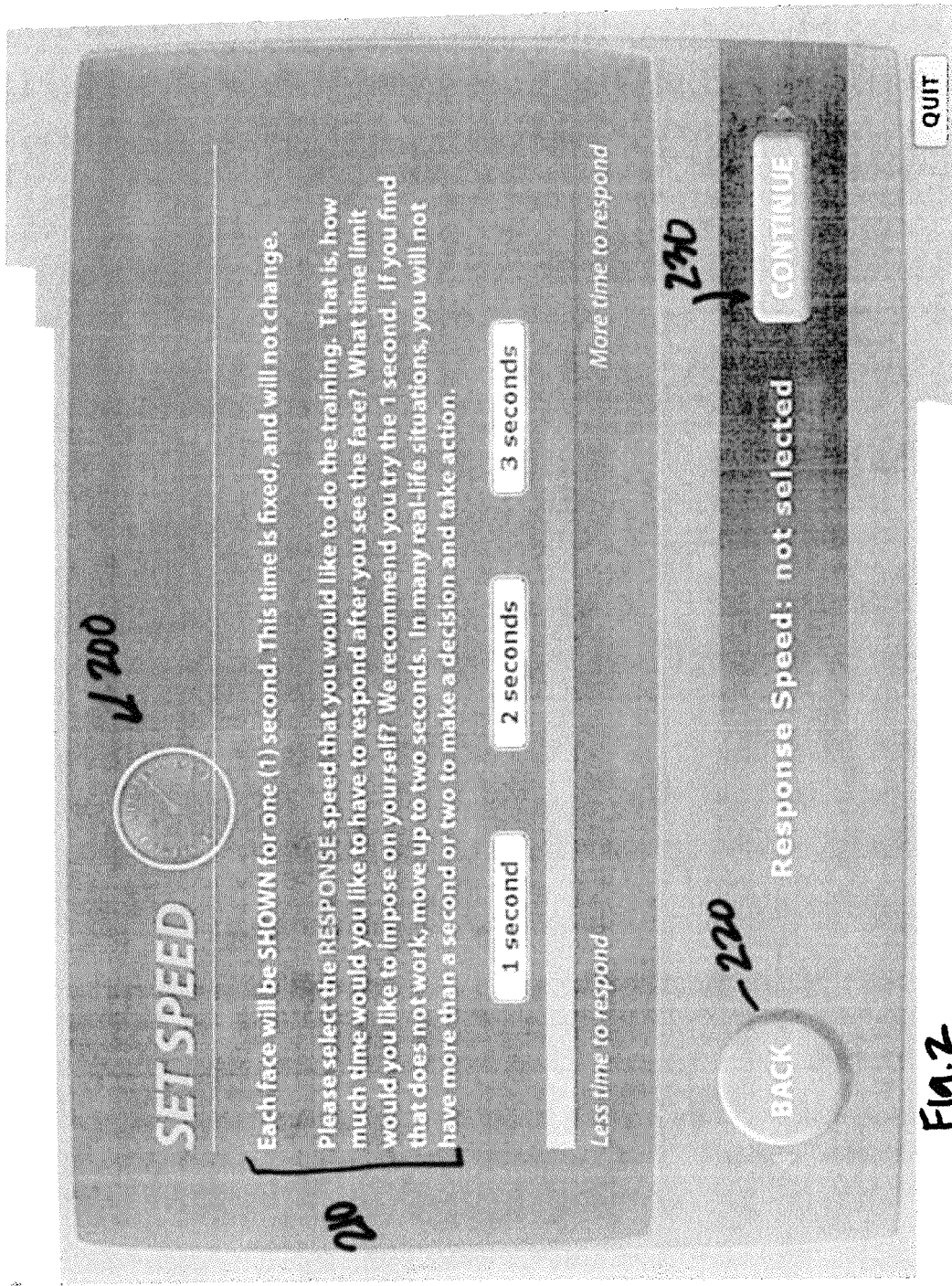
FIG. 2 shows a contemplated screen shot for a contemplated embodiment where the speed of the face displays can be set.

The user continues to the next screen, as shown in FIG. 2, to the "SET SPEED" screen shot 200. A set of instructions 210 is provided to the user (not shown) in order to set the response speed. The user may choose to go "BACK" 220 to a previous screen (not shown) or "CONTINUE" 230 to the next screen (not shown).

Figure 3:
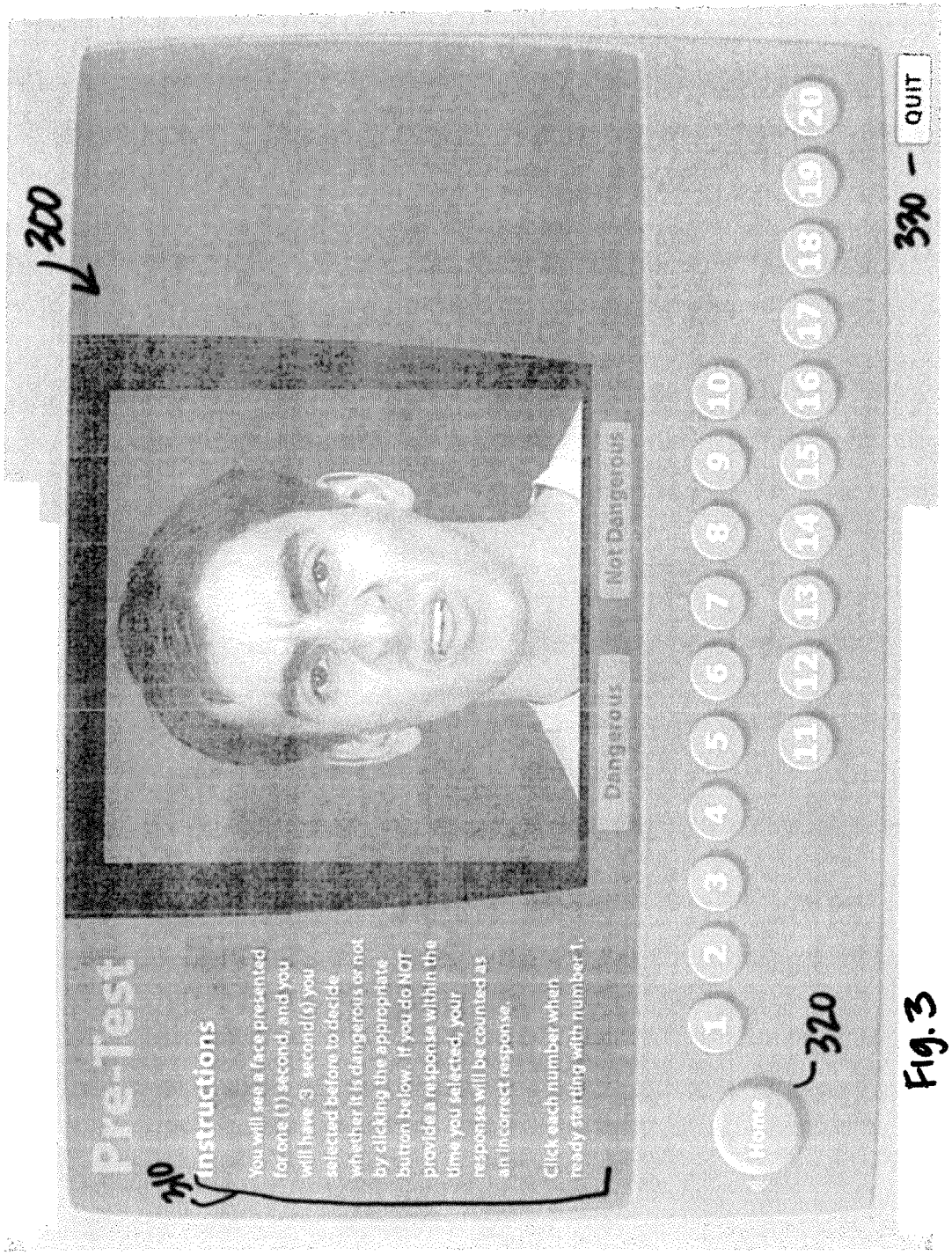
FIG. 3 shows a contemplated screen shot for a contemplated embodiment during the PRE-TEST stage.

The user then continues to the next screen, as shown in FIG. 3, to the "PRE-TEST" screen shot 300. A set of instructions 310 is provided to the user (not shown). The user may choose to go "HOME" 320 (not shown) or "QUIT" 330. The pre-test analyzes the ability of a user to recognize facial expressions with dangerous intent prior to beginning a training module.

During the pre-test phase, the user is presented with multiple target images, whether they are revised target images or final target images, depicting a facial expression. The images provided include images of dangerous intent and non-dangerous intent. Each image is displayed for a specified period of time, for example one second. The user is then given a predetermined period of time to respond as described below. During the predetermined period of time, the user must decide whether or not the facial expression depicts a dangerous intent facial expression. The user must then select the appropriate response button. If the user fails to respond, the response is considered an incorrect response. The total number or correct and incorrect responses is tracked and the results are then displayed for the user. The results may be displayed merely in numerical format, alternatively percentages may be provided. In a contemplated embodiment, the user is shown twenty facial expressions during the PRETEST stage, however, this number is not intended to be a limitation on the scope and one of skill in the art will appreciate that the number of facial expressions depicted may be greater or less. Alternatively, the images may be displayed upon initiation by the user for example through the use of the click of a button or depression of a key.

Figure 4:
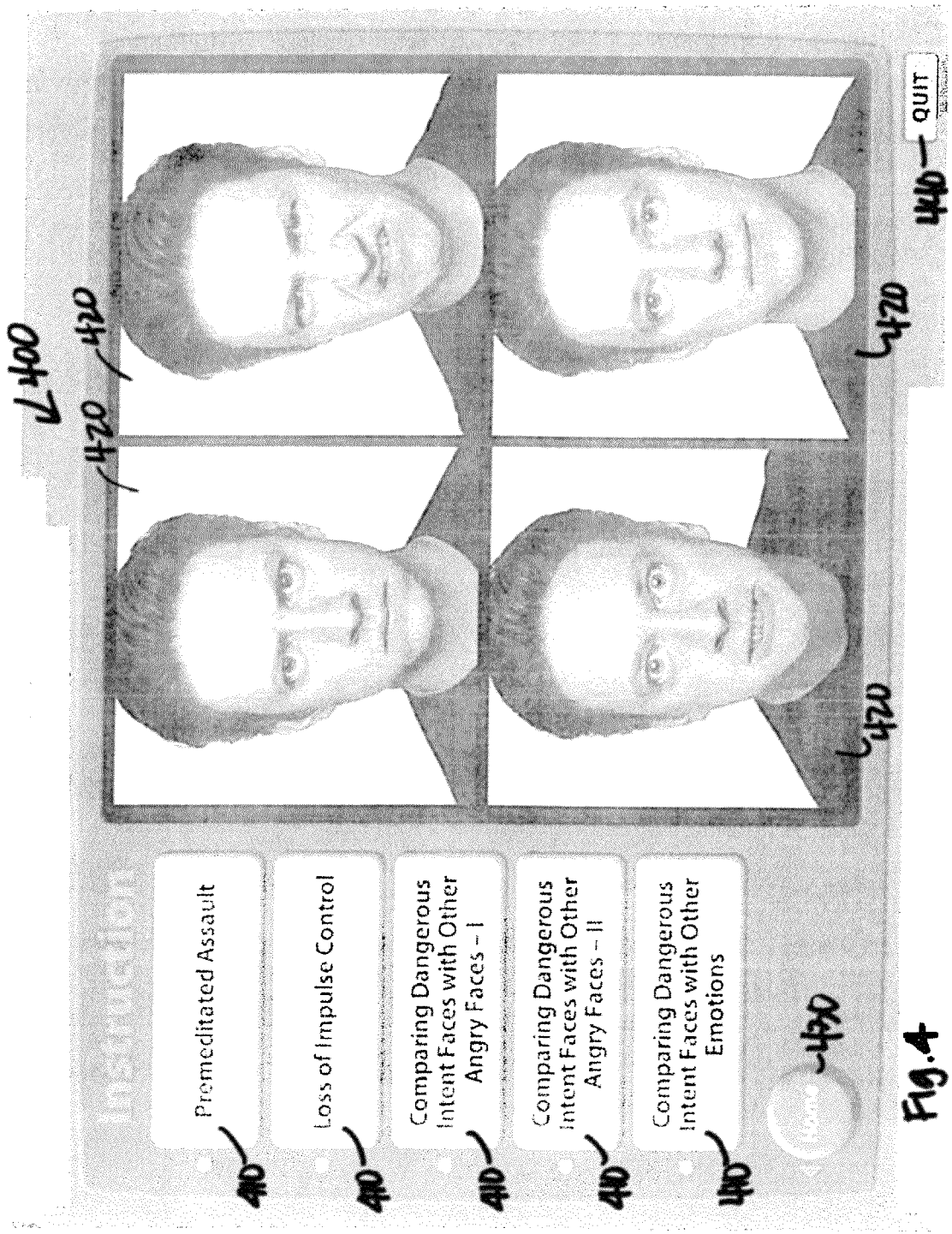
FIG. 4 shows a contemplated screen shot for a contemplated embodiment during the INSTRUCTION stage.
Figure 5:
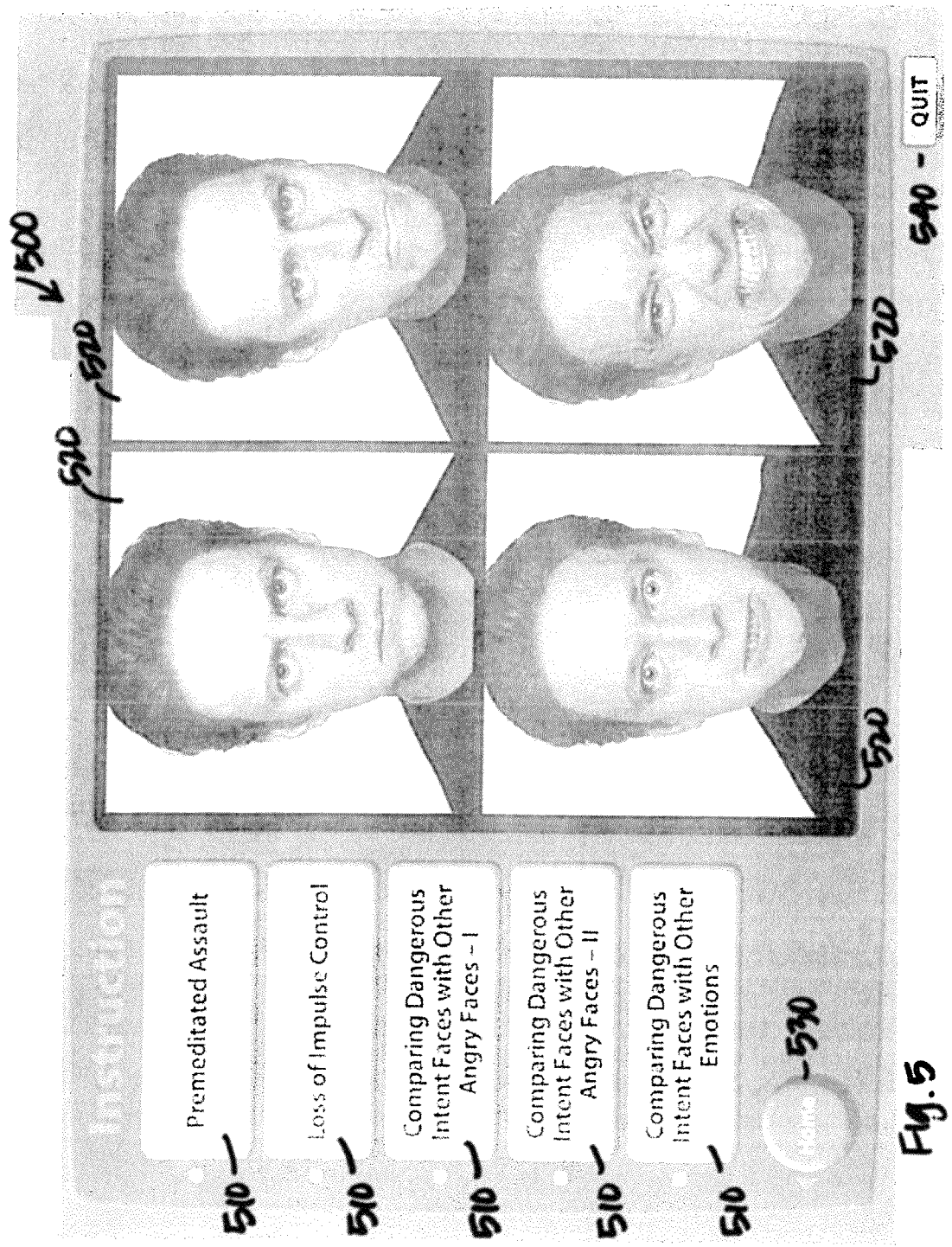
FIG. 5 shows a contemplated screen shot for a contemplated embodiment during the INSTRUCTION stage.

After the pre-test, the user is provided with instructions for identifying dangerous intent facial expression during the "INSTRUCTION" stage, as shown in FIGS. 4 and 5. These two Figures both show screen shots (400 and 500, respectively) of the "INSTRUCTION" stage, where the user (not shown) is able to review various instructions (410 and 510, respectively), along with representative images (420 and 520, respectively). The user may choose to go "HOME" 430 and 530 (not shown) or "QUIT" 440 or 540.

The instructions include the depiction of dangerous intent facial expressions and contrast the dangerous intent facial expression depictions with depiction of distracter facial expressions (facial expressions displaying intent or emotion other than dangerous intent). During the instruction phase, the images provided include images of dangerous intent and non-dangerous intent. This novel tool could also be used for example, by a person planning a trip where the user may be shown images from the cultural region the user will be visiting in order to help the user be more aware of cultural differences in expressions.

Figure 6:
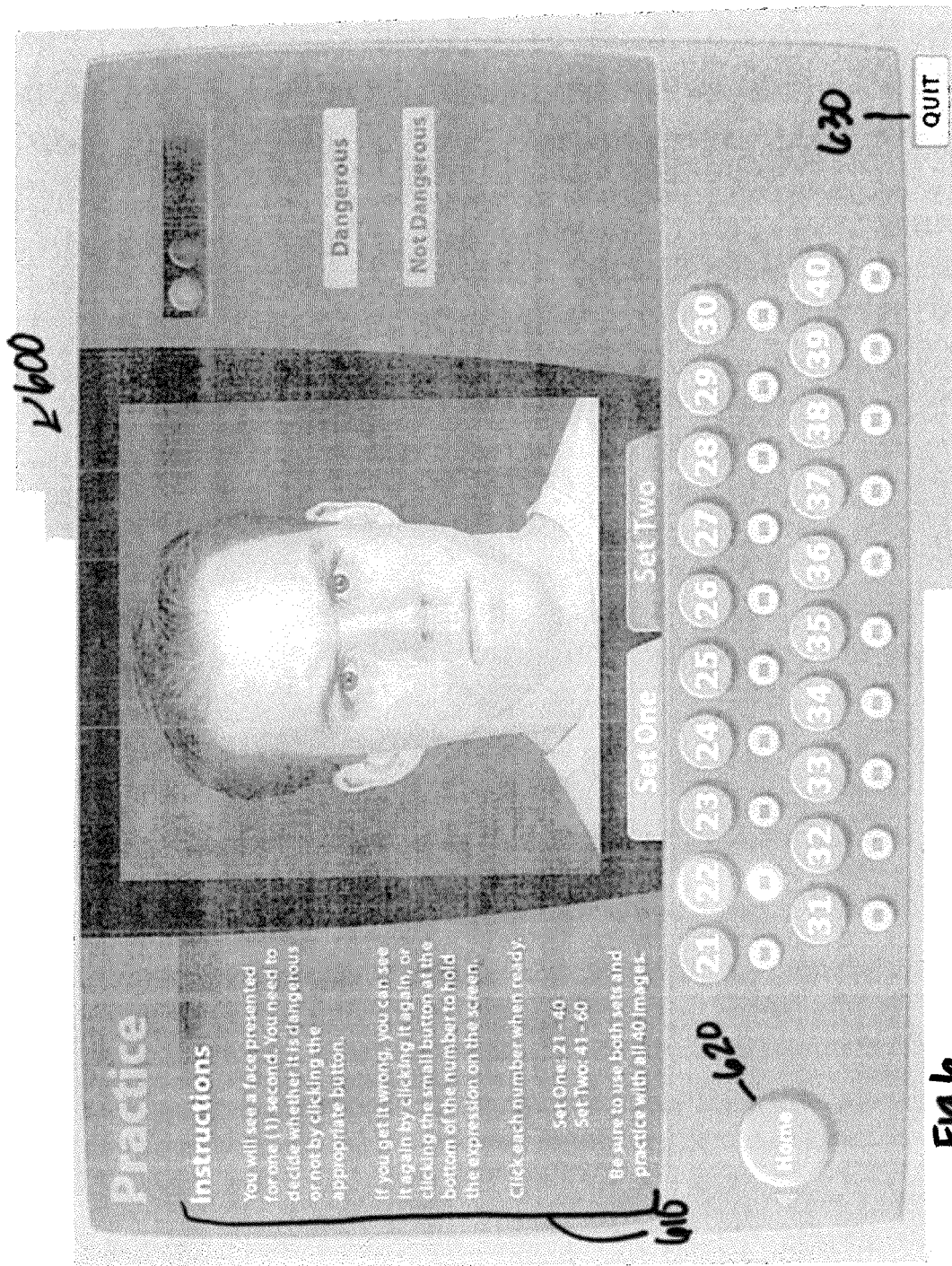
FIG. 6 shows a contemplated screen shot for a contemplated embodiment during the PRACTICE stage.

Next, a practice phase is provided which allows a user to practice honing his facial expression tools based upon the knowledge gained during the instruction portion described immediately above. A contemplated "PRACTICE" phase is depicted in FIG. 6, where a screen shot 600 of the "PRACTICE" phase is shown. A set of instructions 610 is provided to the user (not shown). The user may choose to go "HOME" 620 (not shown) or "QUIT" 630.

During the practice phase, the user is presented an image depicting a facial expression. The image is displayed for one second, or any other predetermined period of time. After the image is displayed, the user makes a selection deciding whether the image displayed depicts a dangerous intent expression or not by selecting the appropriate response. No time limit is set for the user to respond or optionally, a time limit may be preset or selected by the user. If an incorrect selection is made, the image is redisplayed. The image may be displayed automatically or the user may select to view the image again by selecting an appropriate button. In a contemplated embodiment, the practice phase includes forty images, however, this number is not intended to be a limitation on the scope and one of skill in the art will appreciate that the number of facial expressions depicted may be greater or less.

In addition, in another embodiment of the practice phase a neutral expression is morphed into a dangerous intent facial expression to assist the user in identifying changes in facial expression that occur.

Figure 7:
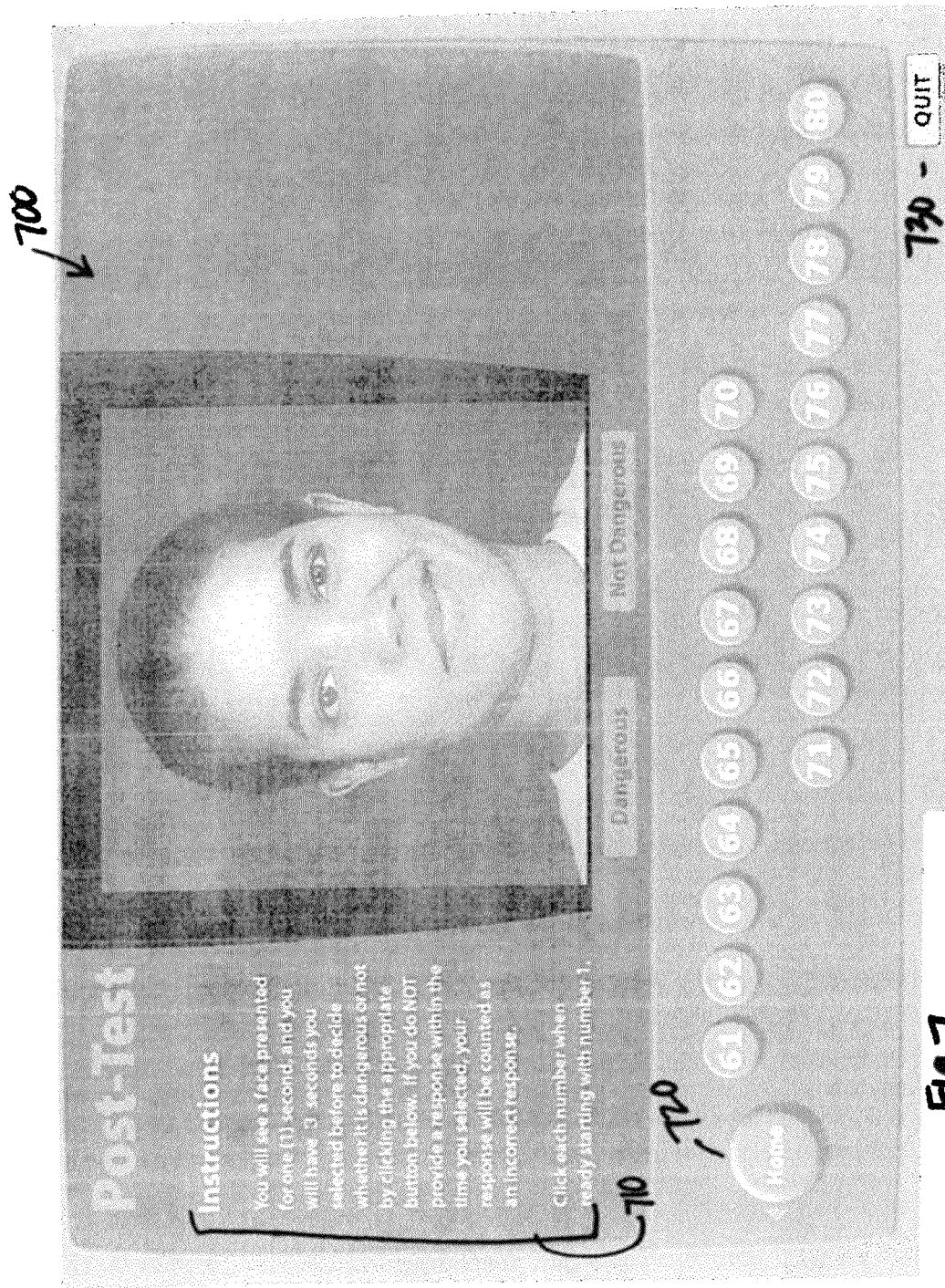
FIG. 7 shows a contemplated screen shot for a contemplated embodiment during the POST-TEST stage.

Finally, a post-test is provided which examines the users' improved ability to recognize dangerous intent facial expressions through the practice or instruction module. A contemplated "POST-TEST" phase is depicted in FIG. 7, where a screen shot 700 of the "POST-TEST" phase is shown. A set of instructions 710 is provided to the user (not shown). The user may choose to go "HOME" 720 (not shown) or "QUIT" 730. During the post-test, images of facial expressions are displayed for one second or any other predetermined period of time. The user is given a set time to respond to the image and select whether or not the image displayed is one of dangerous intent. If the user fails to respond, the response is considered an incorrect response.

Figure 8:
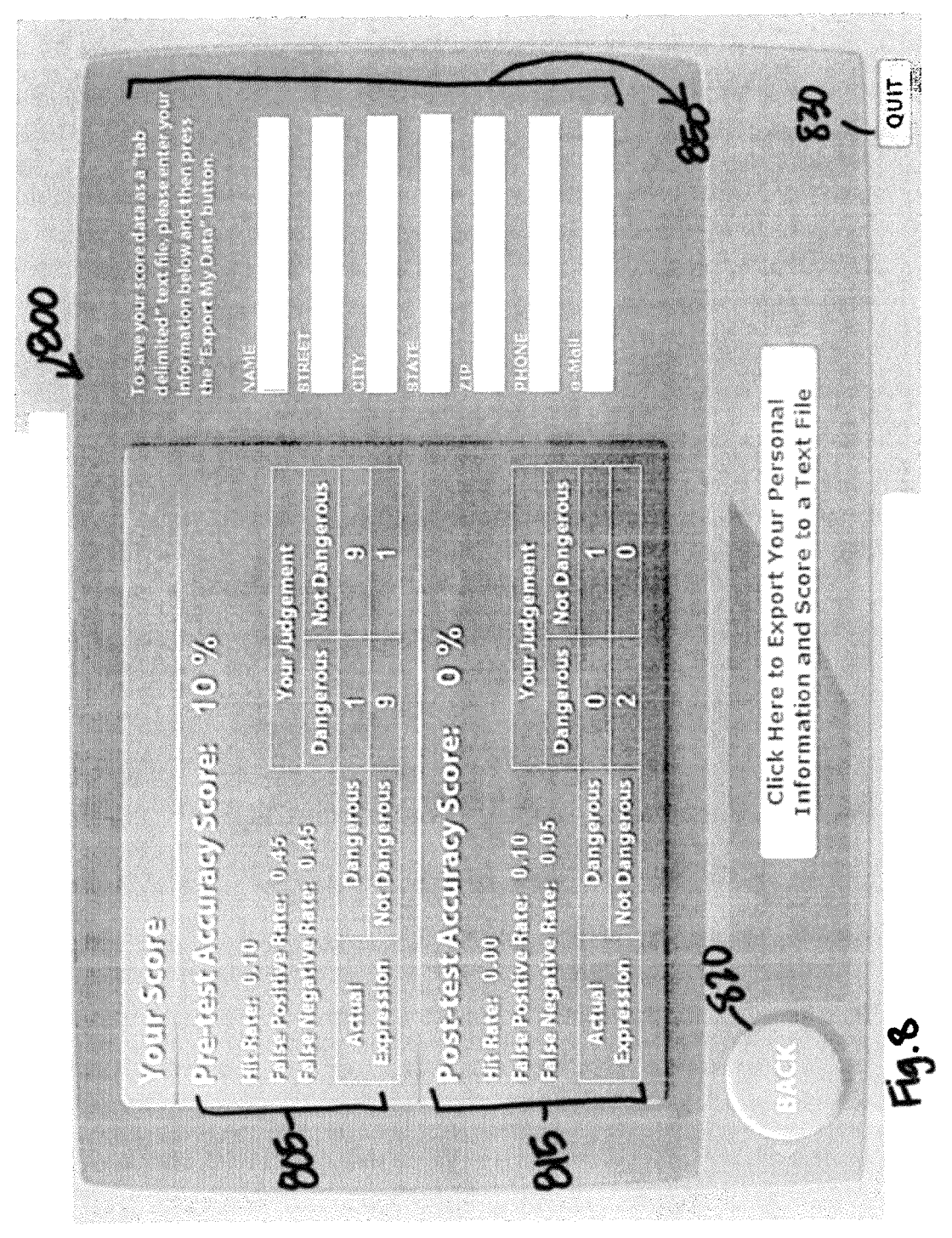

The total number or correct and incorrect responses is tracked and the results are then displayed for the user. A contemplated "YOUR SCORE" phase is depicted in FIG. 8, where a screen shot 800 of the "YOUR SCORE" phase is shown. A Pre-Test Accuracy Score 805 and a Post-Test Accuracy Score 815 is provided to the user (not shown). The user may choose to go "BACK" 820 (not shown) or "QUIT" 830. The user (not shown) may also decide to save the score data by filling out the input blocks provided 850. The results may be displayed merely in numerical format, alternatively percentages may be provided. In a contemplated embodiment, the user is shown twenty facial expressions during the post-test however, this number is not intended to be a limitation on the scope of the invention and one of skill in the art will appreciate that the number of facial expressions depicted may be greater or less.

The results of the pre-test and post-test are provided to the user and may also be provided to an administrator or other trainer. The results may be provided in tabular format, by percentages, or any other statistically relevant means. The results are compared and provided to the user to allow the user to see his improvement and also to provide feedback to the administrator on the effectiveness of the training tool.

In working with different facial expressions, it is important to understand what might lead to a determination that a particular facial expression is neutral, angry or threatening. A neutral expression is the expression displayed by an individual showing very little emotion. A facial expression depicting only hints of anger may include a tightening of the lips but no other obvious signs of anger. A target image, whether it is a revised target image or final target image as contemplated herein, depicting an angry expression may involve the lowering of the brows, raising of the upper eyelid, tightening of the lip and pushing up of the lower lip. A target image, whether it is a revised target image or final target image as contemplated herein, displaying a contemplated premeditated assault facial expression may be displayed by an individual who has planned an attack and is carefully carrying out the plan or planning to carry it out. This premeditated assault facial expression is characterized by a lowering of the brows, raising of the upper eyelid that produces a staring quality and a tightening of the lips. The lower lip may be pushed up, as if the attacker is trying to control his emotions in carrying out the planned attacked. This facial expression is a controlled expression of anger that displays the look of determination and concentration.

A target image, whether it is a revised target image or final target image as contemplated herein, displaying an exemplar loss of impulse control facial expression may be seen on an individual who has just lost his temper and is about to attack. The facial expression is characterized by a slight lowering of the brows, strong raising of the upper eyelid that produces bulging, staring quality to the eyes, a strong tightening of the lips and a distinct absence of the pushing up of the lower lip. The absence of the lower lip push may be significant because it is usually associated with emotion control and in the expression the individual has lost control of his anger.

A, whether it is a revised target image or final target image as contemplated herein, target image of a facial expression displayed during an attack is similar to the loss of impulse control but is much more intense. Such an expression may include a displaying of the teeth, squinted eyes in addition to the characteristic described above in relation to the loss of impulse control facial expression.

The above facial expression and image descriptions are not intended to be an exhaustive representation of dangerous intent facial expressions but are only exemplar in nature. Angry facial expressions are often confused with expression of disgust and contempt. Facial expressions of disgust and contempt may include such characteristics as nose wrinkling, raising of the upper lip, and changes in skin tone. Contempt is usually but not always associated with unilateral or asymmetrical expression. These expressions are very different from angry expressions associated with premeditated assault of loss of impulse control and contemplated embodiments are designed to enable a user to distinguish between the different types of expression.

The system and method described are designed to operate at varying speeds to improve the recognition time of the user. The response time to seeing a facial expression, analyzing it and responding may be set by an administrator, alternatively the user may select the response time. For example, the response time may be set so that the user must respond within 1 second after seeing the facial expression or it may be expanded to any length of time deemed appropriate for training. In one embodiment the response time is automatically reduced as the user's proficiency increases.

While the above embodiments are described with respect to target images displaying facial expressions of dangerous intent, one of skill in the art will appreciate that the embodiments not limited to dangerous intent facial expressions and other facial expressions and the evaluation thereof are contemplated within the scope of this disclosure.

In conjunction with the novel method, another novel method for developing target images is disclosed. In this approach, the DWIS analysis is performed as follows. A specified number of participants were selected. From the participants, cases, to be included in the imagery, are selected based on whether the participant had witnessed or experienced a physical assault or been threatened with an assault. A control group is also selected from those participants who answered no to never seeing the facial expression of someone just before they made a physical assault, no to not remembering someone's expression before an assault, and no to seeing someone's expression but not seeing it in the a group of pictures displayed.

Analyses were performed on the selected sample participants' responses so that a total of one point was assigned to each subset for each participant: Loss of Control (LC), and Premeditated Assault (PA). The data is then statistically evaluated using various methods. For example, chi-squares, one way analysis of variance, percentage and mean data, percentage and mean data to run Spearman's rhos.

From the results the top four photographs are identified and examined. Examples of the analysis and detail of such are included in the Examples section.

EXAMPLES

Example 1

1.0 DIWS Analysis—Merged Data

Original sample had n of 585. From Israel there were 199 participants, from UK there were 50 participants, from Scotland Yard there were 84 participants, from Canada there were 68 participants, and from Korea there were 184 participants. Dropped all Scotland Yard data.

From remaining data, selected cases based on whether the participant had witnessed or experienced a physical assault. For Israel and Korea, a participant was selected if he or she had said yes to experiencing or witnessing an assault on or off duty. For UK, a participant was selected if he or she had said yes to being threatened with physical assault, being assaulted, or witnessing an assault. For Canada, a participant was selected if he or she answered no to never seeing the facial expression of someone just before they made a physical assault, no to not remembering someone's expression before an assault, and no to seeing someone's expression but not seeing it in the 12 pictures.

Selected sample had n of 385. From Israel there were 161 participants, from UK there were 46 participants, from Canada there were 46 participants, and from Korea there were 132 participants. All analyses were performed on this selected sample.

Transformed data so that a total of one point was assigned to each subset for each participant: Loss of Control (LC), and Premeditated Assault (PA).

Ran 24 chi-squares with country as the IV and photograph chosen as the DV. For LC, significant results for photos 4, 6, 7, 10, and 11. (See Table 2). For PA, significant results for photos 4, 5, 10 and 12. (See Table 8).

Ran 24 one-way ANOVAS with country as IV and transformed data as the DV. For LC, significant results for photos 4, 6, 7, and 10. (See Table 3). For PA, significant results for photos 5, 10, and 12. (See Table 9).

Used percentage and mean data to run Spearman's rhos between countries for LC. For percentage data, significant among all country pairs. For means data, significant for all country pairs except for Korea and Canada. (See Table 4). Used percentage and mean data to run Spearman's rhos between countries for PA. For percentage data, significant for all country pairs except for Korea and UK. For means data, significant for all country pairs except for Korea and UK, and Korea and Canada. (See Table 10).

Identified top four photos chosen for LC (See Table 5) and PA (See Table 11) for percent chosen and means by country.

Examined top four photographs chosen for LC (See Tables 6 and 7) and PA (See Tables 12 and 13) by looking at all possible pairs. Data were transformed so that participants were given one point for choosing either of the photos in a pair, and zero points for not. Additionally, for the data in which one point was given for each subset, all possible pairs from top four were summed.

TABLE 2

Percent chosen for each photo by country for loss of control (LC);
Chi-square analyses for country on percent chosen for each photo.

| | Israel | | UK | | BC | | Korea | | Across Countries | | Chi-Squares | | |
|---|---|---|---|---|---|---|---|---|---|---|---|---|---|
| Photo Id | % for LC | Ranking for LC | % for LC | Ranking for LC | % for LC | Ranking for LC | % for LC | Ranking for LC | % for LC | Ranking for LC | $\chi^2$ | df | Asymp. Sig. (2 sided) |
| 1 | 3.1 | 9 | 0.0 | 10 | 4.7 | 6 | 3.0 | 10 | 2.9 | 11 | 1.89 | 3 | .60 |
| 2 | 63.8 | 2 | 67.4 | 1 | 48.8 | 2 | 70.5 | 1 | 64.8 | 2 | 6.87 | 3. | 08 |
| 3 | 4.4 | 7 | 2.2 | 7 | 4.7 | 6 | 5.3 | 8 | 4.5 | 7 | .79 | 3 | .85 |
| 4 | 5.0 | 5 | 4.3 | 6 | 4.7 | 6 | 15.9 | 5 | 8.7 | 5 | 13.43 | 3 | .00 |
| 5 | 3.8 | 8 | 0.0 | 10 | 0.0 | 11 | 6.8 | 7 | 3.9 | 8 | 6.56 | 3 | .09 |
| 6 | 79.4 | 1 | 67.4 | 1 | 51.2 | 1 | 66.7 | 2 | 70.3 | 1 | 14.89 | 3 | .00 |
| 7 | 3.1 | 9 | 2.2 | 7 | 11.6 | 5 | 2.3 | 12 | 3.7 | 9 | 8.85 | 3 | .03 |
| 8 | 40.6 | 4 | 34.8 | 4 | 27.9 | 3 | 34.1 | 4 | 36.2 | 4 | 2.93 | 3 | .40 |
| 9 | 2.5 | 12 | 2.2 | 7 | 4.7 | 6 | 4.5 | 9 | 3.4 | 10 | 1.33 | 3 | .40 |
| 10 | 5.0 | 5 | 15.2 | 5 | 0.0 | 11 | 13.6 | 6 | 8.7 | 6 | 13.42 | 3 | .00 |
| 11 | 49.4 | 3 | 50.0 | 3 | 23.3 | 4 | 58.3 | 3 | 49.6 | 3 | 15.97 | 3 | .00 |
| 12 | 3.1 | 9 | 0.0 | 10 | 4.7 | 6 | 3.0 | 10 | 2.9 | 11 | 1.89 | 3 | .60 |

TABLE 3

Means for each photo by country for loss of control Percent chosen for each photo by country
for loss of control (LC); Chi- square analyses for country on percent chosen for each photo.

| | Israel | | UK | | BC | | Korea | | Across Countries | | ANOVA | | | |
|---|---|---|---|---|---|---|---|---|---|---|---|---|---|---|
| Photo Id | Means for LC | Ranking for LC | Means for LC | Ranking for LC | Means for LC | Ranking for LC | Means for LC | Ranking for LC | Means for LC | Ranking for LC | F | df | Sig. | $\eta_p^2$ |
| 1 | .0103 | 12 | .0000 | 10 | 0.291 | 6 | .0094 | 11 | .0109 | 12 | 1.30 | 3 | .28 | .01 |
| 2 | .2451 | 2 | .3111 | 1 | .2835 | 2 | .2545 | 1 | .2607 | 2 | 1.00 | 3 | .39 | .01 |
| 3 | .0144 | 9 | .0054 | 7 | .0279 | 7 | .0201 | 8 | .0168 | 7 | .61 | 3 | .61 | .01 |
| 4 | .0176 | 6 | .0435 | 6 | .0123 | 8 | .0541 | 5 | .0328 | 5 | 2.98 | 3 | .03 | .02 |
| 5 | .0124 | 10 | .0000 | 11 | .0000 | 11 | .22226 | 7 | .0130 | 9 | 2.21 | 3 | .09 | .02 |
| 6 | .3083 | 1 | .2893 | 2 | .2912 | 1 | .2255 | 2 | .2754 | 1 | 3.36 | 3 | .02 | .03 |
| 7 | .0145 | 8 | .0030 | 8 | .0519 | 5 | .0076 | 12 | .0149 | 8 | 2.96 | 3 | .03 | .02 |
| 8 | .1404 | 4 | .1157 | 4 | .1149 | 4 | .1233 | 4 | .1286 | 4 | .41 | 3 | .75 | .00 |
| 9 | .0104 | 11 | .0030 | 9 | .0123 | 8 | .0151 | 9 | .0113 | 11 | .44 | 3 | .73 | .00 |
| 10 | .0207 | 5 | .0526 | 5 | .0000 | 11 | .0453 | 6 | .0307 | 6 | 3.15 | 3 | .03 | .02 |
| 11 | .1829 | 3 | .1737 | 3 | .1170 | 3 | .2073 | 3 | .1828 | 3 | 2.03 | 3 | .11 | .02 |
| 12 | .0156 | 7 | .0000 | 12 | .0123 | 8 | .0107 | 10 | .0116 | 10 | .250 | 3 | .68 | .00 |

TABLE 4

Spearman's rho between countries for loss
of control for percent chosen and means.

| | Percent chosen | | | |
|---|---|---|---|---|
| Means | Israel | UK | Canada | Korea |
| Israel | | .88* | .61* | .94* |
| UK | .89* | | .72* | .87* |
| Canada | .61* | .66* | | .54* |
| Korea | .85* | .89* | .49 | |

*p < .05

TABLE 5

Top four photographs for loss of control for percent
chosen and means by country

| Country | Percent chosen | Means |
|---|---|---|
| Israel | 6, 2, 11, 8 | 6, 2, 11, 8 |
| UK | 2 = 6, 11, 8 | 2, 6, 11, 8 |
| Canada | 6, 2, 8, 11 | 6, 2, 11, 8 |
| Korea | 2, 6, 11, 8 | 2, 6, 11, 8 |
| Across Countries | 6, 2, 8, 11 | 6, 2, 11, 8 |

TABLE 6

Percentages for photographs chosen for loss of control on all data

|        | 6    | 2    | 11   | 8    | 6 + 2 | 6 + 11 | 6 + 8 | 2 + 11 | 2 + 8 | 11 + 8 |
|--------|------|------|------|------|-------|--------|-------|--------|-------|--------|
| Israel | 79.4 | 63.8 | 49.4 | 40.6 | 90.0  | 86.3   | 87.5  | 81.9   | 80.6  | 77.5   |
| UK     | 67.4 | 67.4 | 50.0 | 34.8 | 89.1  | 78.3   | 69.6  | 82.6   | 73.9  | 65.2   |
| BC     | 51.2 | 48.8 | 23.3 | 27.9 | 74.4  | 62.8   | 55.8  | 58.1   | 60.5  | 41.9   |
| Korea  | 66.7 | 70.5 | 58.3 | 34.1 | 83.3  | 84.1   | 85.6  | 89.4   | 85.6  | 78.8   |

TABLE 7

Means for photographs chosen for loss of control on all data

|        | 6      | 2      | 11     | 8      | 6 + 2  | 6 + 11 | 6 + 8  | 2 + 11 | 2 + 8  | 11 + 8 |
|--------|--------|--------|--------|--------|--------|--------|--------|--------|--------|--------|
| Israel | 0.3083 | 0.2451 | 0.1829 | 0.1404 | 0.5534 | 0.4913 | 0.4488 | 0.4281 | 0.3856 | 0.3234 |
| UK     | 0.2893 | 0.3111 | 0.1737 | 0.1157 | 0.6004 | 0.4630 | 0.4050 | 0.4848 | 0.4267 | 0.2893 |
| BC     | 0.2912 | 0.2835 | 0.1170 | 0.1149 | 0.5747 | 0.4081 | 0.4060 | 0.4005 | 0.3984 | 0.2319 |
| Korea  | 0.2255 | 0.2545 | 0.2073 | 0.1233 | 0.4800 | 0.4327 | 0.3487 | 0.4618 | 0.3778 | 0.3305 |

TABLE 8

Percent chosen for each photo by country for premeditated assault (PA);
Chi-square analyses for country on percent chosen for each photo

| Photo Id | Israel % for PA | Israel Ranking for PA | UK % for PA | UK Ranking for PA | BC % for PA | BC Ranking for PA | Korea % for PA | Korea Ranking for PA | Across Countries % for PA | Across Countries Ranking for PA | Chi-Squares χ² | df | Asymp. Sig. (2 sided) |
|----|------|----|------|----|------|----|------|----|------|----|-------|---|-----|
| 1  | 27.5 | 4  | 15.6 | 8  | 16.3 | 5  | 21.2 | 5  | 22.6 | 5  | 4.60  | 3 | .20 |
| 2  | 3.1  | 12 | 4.4  | 12 | 4.7  | 11 | 6.1  | 12 | 4.5  | 12 | 1.46  | 3 | .69 |
| 3  | 40.6 | 2  | 28.9 | 2  | 27.9 | 2  | 36.4 | 3  | 36.3 | 2  | 3.67  | 3 | .30 |
| 4  | 56.9 | 1  | 26.7 | 3  | 51.2 | 1  | 56.8 | 1  | 52.6 | 1  | 14.29 | 3 | .00 |
| 5  | 30.0 | 3  | 17.8 | 6  | 14.0 | 7  | 41.7 | 2  | 30.8 | 3  | 16.67 | 3 | .00 |
| 6  | 6.9  | 11 | 11.1 | 9  | 11.6 | 8  | 6.8  | 11 | 7.9  | 11 | 1.90  | 3 | .59 |
| 7  | 16.3 | 7  | 17.8 | 6  | 9.3  | 9  | 13.6 | 7  | 14.7 | 7  | 1.76  | 3 | .62 |
| 8  | 12.5 | 8  | 24.4 | 4  | 7.0  | 10 | 12.9 | 10 | 13.4 | 8  | 6.39  | 3 | .09 |
| 9  | 24.0 | 5  | 20.0 | 5  | 16.3 | 5  | 28.8 | 4  | 24.5 | 4  | 3.38  | 3 | .34 |
| 10 | 7.5  | 10 | 6.7  | 11 | 2.3  | 12 | 16.7 | 6  | 10.0 | 10 | 11.00 | 3 | .01 |
| 11 | 10.6 | 9  | 11.1 | 9  | 20.9 | 3  | 13.6 | 7  | 12.9 | 9  | 3.40  | 3 | .33 |
| 12 | 22.5 | 35.6 | 1  | 20.9 | 3  | 13.6 | 7  | 20.8 | 6  | 10.34 | 3 | .02 |

TABLE 9

Means for each photo by country for premeditated assault (PA); One-way ANOVAs for country on each photo

| Photo Id | Israel Means for PA | Israel Ranking for PA | UK Means for PA | UK Ranking for PA | BC Means for PA | BC Ranking for PA | Korea Means for PA | Korea Ranking for PA | Across Countries Means for PA | Across Countries Ranking for PA | ANOVA F | df | Sig. | $\eta_p^2$ |
|----|-------|----|-------|----|-------|----|-------|-----|-------|----|------|---|-----|-----|
| 1  | .1014 | 4  | .0533 | 9  | .0735 | 5  | .0766 | 5   | .0839 | 5  | 1.24 | 3 | .29 | .01 |
| 2  | .0135 | 12 | .0258 | 11 | .0077 | 11 | .0252 | 11  | .0183 | 12 | .59  | 3 | .62 | .01 |
| 3  | .1604 | 2  | .1311 | 3  | .1216 | 2  | .1296 | 3.= | .1418 | 2  | .71  | 3 | .55 | .01 |
| 4  | .2246 | 1  | .1589 | 2  | .3000 | 1  | .2250 | 1   | .2255 | 1  | 2.15 | 3 | .09 | .02 |
| 5  | .1148 | 3  | .0813 | 5  | .0502 | 8  | .1458 | 2   | .1143 | 3  | 3.55 | 3 | .02 | .03 |
| 6  | .0259 | 11 | .0664 | 8  | .0619 | 7  | .0227 | 12  | .0336 | 11 | 2.04 | 3 | .11 | .02 |
| 7  | .0599 | 7  | .0793 | 6  | .0309 | 9  | .0515 | 8   | .0560 | 7  | .85  | 3 | .47 | .01 |
| 8  | .0508 | 8  | .1033 | 4  | 03.09 | 9  | .0503 | 9   | .0546 | 9  | 1.87 | 3 | .13 | .02 |
| 9  | .0879 | 5  | .0682 | 7  | .0658 | 6  | .1068 | 4   | .0896 | 4  | .99  | 3 | .40 | .01 |
| 10 | .0311 | 10 | .0240 | 12 | .0019 | 12 | .0605 | 6   | .0371 | 10 | 3.33 | 3 | .02 | .03 |
| 11 | .0446 | 9  | .0498 | 10 | .1044 | 3  | .0541 | 7   | .0553 | 8  | 1.56 | 3 | .20 | .01 |
| 12 | .0785 | 6  | .1607 | 1  | .1026 | 4  | .0478 | 10  | .0803 | 6  | 5.19 | 3 | .00 | .04 |

TABLE 10

Spearman's rho between countries for loss of control for percent chosen and means

| Means | Percent chosen | | | |
|---|---|---|---|---|
| | Israel | UK | Canada | Korea |
| Israel |  | .73* | .73* | .89* |
| UK | .68* |  | .65* | .46* |
| Canada | .66* | .55* |  | .59* |
| Korea | .85* | .28* | .45 |  |

*p < .05

TABLE 11

Top four photographs for premeditated assault for percent chosen and means by country

| Country | Percent chosen | Means |
|---|---|---|
| Israel | 4, 3, 5, 1 | 4, 3, 5, 1 |
| UK | 12, 3, 4, 8 | 12, 4, 3, 8 |
| Canada | 4, 3, 11 = 12 | 4, 3, 11, 12 |
| Korea | 4, 5, 3, 9 | 4, 5, 3, 9 |
| Across Countries | 4, 3, 5, 9 | 4, 5, 3, 9 |

TABLE 12

Percentages for photographs chosen for premeditated assault on all data

| | 4 | 3 | 5 | 9 | 4 + 3 | 4 + 5 | 4 + 9 | 3 + 5 | 3 + 9 | 5 + 9 |
|---|---|---|---|---|---|---|---|---|---|---|
| Israel | 56.9 | 40.6 | 30.0 | 24.2 | 78.1 | 70.0 | 68.8 | 58.1 | 56.9 | 47.5 |
| UK | 26.7 | 28.9 | 17.8 | 20.0 | 51.1 | 42.2 | 40.0 | 37.8 | 40.0 | 26.7 |
| BC | 51.2 | 27.9 | 14.0 | 16.3 | 62.8 | 58.1 | 58.1 | 32.6 | 37.6 | 23.3 |
| Korea | 56.8 | 36.4 | 41.7 | 12.9 | 84.1 | 77.3 | 67.4 | 56.8 | 56.1 | 54.5 |

TABLE 13

Means for photographs chosen for premeditated assault on all data

| | 4 | 3 | 5 | 9 | 4 + 3 | 4 + 5 | 4 + 9 | 3 + 5 | 3 + 9 | 5 + 9 |
|---|---|---|---|---|---|---|---|---|---|---|
| Israel | 0.2246 | 0.1604 | 0.1148 | 0.0879 | 0.3849 | 0.3394 | 0.3124 | 0.2482 | 0.2482 | 0.2027 |
| UK | 0.1589 | 0.1311 | 0.0813 | 0.0682 | 0.2900 | 0.2402 | 0.2271 | 0.2124 | 0.1993 | 0.1496 |
| BC | 0.3000 | 0.1216 | 0.0502 | 0.0658 | 0.4216 | 0.3502 | 0.3658 | 0.1719 | 0.1874 | 0.1160 |
| Korea | 0.2255 | 0.1418 | 0.1143 | 0.0896 | 0.3546 | 0.3708 | 0.3318 | 0.2754 | 0.2364 | 0.2525 |

Example 2

2.0 DIWS Analysis—Two Samples

Original sample had n of 585. From Israel there were 199 participants, from UK there were 50 participants, from Scotland Yard there were 84 participants, from Canada there were 68 participants, from Korea 1 there were 105 participants, and from Korea 2 there were 79 participants. Korea 1 refers to the first Korean data collection while Korea 2 refers to the second Korean data collection. Dropped all Scotland Yard data.

From remaining data, selected cases based on whether the participant had witnessed or experienced a physical assault. For Israel and Korea, a participant was selected if he or she had said yes to experiencing or witnessing an assault on or off duty. For UK, a participant was selected if he or she had said yes to being threatened with physical assault, being assaulted, or witnessing an assault. For Canada, a participant was selected if he or she answered no to never seeing the facial expression of someone just before they made a physical assault, no to not remembering someone's expression before an assault, and no to seeing someone's expression but not seeing it in the 12 pictures.

Selected sample had n of 385. From Israel there were 161 participants, from UK there were 46 participants, from Canada there were 46 participants, from Korea 1 there were 65 participants, and from Korea 2 there were 67 participants. All analyses were performed on this selected sample.

Transformed data so that a total of one point was assigned to each subset for each participant: Loss of Control (LC), and Premeditated Assault (PA)

Ran 24 chi-squares with country as the IV and photograph chosen as the DV. For LC, significant results for photos 2, 4, 6, 7, 10, and 11. (See Table 14). For PA, significant results for photos 4, 5, 10 and 12. (See Table 20).

Ran 24 one-way ANOVAS with country as IV and transformed data as the DV. For LC, significant results for photos 4, 6, 7, and 10. (See Table 15). For PA, significant results for photos 5, 10, and 12. (See Table 21).

Used percentage and mean data to run Spearman's rhos between countries for LC. For percentage data, significant among all country pairs. For means data, significant for all country pairs except for Korea 2 and Canada. (See Table 16). Used percentage and mean data to run Spearman's rhos between countries for PA. For percentage data, significant for all country pairs except for Korea 2 and UK, and Korea 2 and Canada. For means data, significant for all country pairs except for Korea 2 and Canada, and Korea 2 and Canada for means data. (See Table 22).

Identified top four photos chosen for LC (See Table 17) and PA (See Table 23) for percent chosen and means by country.

Examined top four photographs chosen for LC (See Tables 18 and 19) and PA (See Tables 24 and 25) by looking at all possible pairs. Data were transformed so that participants were given one point for choosing either of the photos in a pair, and zero points for not. Additionally, for the data in which one point was given for each subset, all possible pairs from top four were summed.

TABLE 14

Percent chosen for each photo by country for loss of control (LC);
Chi-square analyses for country on percent chosen for each photo

| Photo ID | Israel % for LC | Israel Ranking for LC | UK % for LC | UK Ranking for LC | BC % for LC | BC Ranking for LC | Korea 1 % for LC | Korea 1 Ranking for LC | Korea 2 % for LC | Korea 2 Ranking for LC | Across Countries % for LC | Across Countries Ranking for LC | $\chi^2$ | df | Asymp. Sig. (2-sided) |
|---|---|---|---|---|---|---|---|---|---|---|---|---|---|---|---|
| 1 | 3.1 | 9 | 0.0 | 10 | 4.7 | 6 | 1.5 | 10 | 4.5 | 10 | 2.9 | 11 | 2.90 | 4 | .57 |
| 2 | 63.8 | 2 | 67.4 | 1 | 48.8 | 2 | 76.9 | 1 | 64..2 | 1 | 64.8 | 2 | 9.22 | 4 | .06 |
| 3 | 4.4 | 7 | 2.2 | 7 | 4.7 | 6 | 6.2 | 7 | 4.5 | 10 | 4.5 | 7 | 1.01 | 4 | .91 |
| 4 | 5.0 | 5 | 4.3 | 6 | 4.7 | 6 | 10.8 | 6 | 20.9 | 5 | 8.7 | 5 | 17.71 | 4 | .00 |
| 5 | 3.8 | 8 | 0.0 | 10 | 0.0 | 11 | 6.2 | 7 | 7.5 | 7 | 3.9 | 8 | 6.71 | 4 | .15 |
| 6 | 79.4 | 1 | 67.4 | 1 | 51.2 | 1 | 75.4 | 2 | 58.2 | 2 | 70.3 | 1 | 19.55 | 4 | .00 |
| 7 | 3.1 | 9 | 2.2 | 7 | 11.6 | 5 | 1.5 | 10 | 3.0 | 11 | 3.7 | 9 | 9.04 | 4 | .06 |
| 8 | 40.6 | 4 | 34.8 | 4 | 27.9 | 3 | 32.3 | 4 | 35.8 | 4 | 36.2 | 4 | 3.11 | 4 | .54 |
| 9 | 2.5 | 12 | 2.2 | 7 | 4.7 | 6 | 3.1 | 9 | 6.0 | 8 | 3.4 | 10 | 2.17 | 4 | .70 |
| 10 | 5.0 | 5 | 15.2 | 5 | 0.0 | 11 | 12.3 | 5 | 14.9 | 6 | 8.7 | 6 | 13.70 | 4 | .01 |
| 11 | 49.4 | 3 | 50.0 | 3 | 23.3 | 4 | 66.2 | 3 | 50.7 | 3 | 49.6 | 3 | 19.10 | 4 | .00 |
| 12 | 3.1 | 9 | 0.0 | 10 | 4.7 | 6 | 0.0 | 12 | 6.0 | 8 | 2.9 | 12 | 6.08 | 4 | .19 |

TABLE 15

Means for each photo by country for loss of control (LC); One-way ANOVAs for country on each photo

| Photo ID | Israel Means for LC | Israel Ranking for LC | UK Means for LC | UK Ranking for LC | BC Means for LC | BC Ranking for LC | Korea 1 Means for LC | Korea 1 Ranking for LC | Korea 2 Means for LC | Korea 2 Ranking for LC | Across Countries Means for LC | Across Countries Ranking for LC | AVONA F | df | Sig | $\eta_p^2$ |
|---|---|---|---|---|---|---|---|---|---|---|---|---|---|---|---|---|
| 1 | .0103 | 12 | .0000 | 10 | .0291 | 6 | .0051 | 10 | .0137 | 11 | .0109 | 12 | 1.09 | 4,376 | .36 | .01 |
| 2 | .2451 | 2 | .3111 | 1 | .2835 | 2 | .2643 | 1 | .2450 | 1 | .2607 | 2 | .80 | 4,376 | .53 | .01 |
| 3 | .0144 | 9 | .0054 | 7 | .0279 | 7 | .0203 | 7 | .0199 | 9 | .0168 | 7 | .46 | 4,376 | .77 | .01 |
| 4 | .0176 | 6 | .0435 | 6 | .0123 | 8 | .0382 | 6 | .0697 | 5 | .0328 | 5 | 2.85 | 4,376 | .02 | .03 |
| 5 | .0124 | 10 | .0000 | 11 | .0000 | 11 | .0203 | 7 | .0249 | 7 | .0130 | 9 | 1.70 | 4,376 | .15 | .02 |
| 6 | .3083 | 1 | .2893 | 2 | .2912 | 1 | .2540 | 2 | .1978 | 2 | .2754 | 1 | 3.03 | 4,376 | .02 | .03 |
| 7 | .0145 | 8 | .0030 | 8 | .0519 | 5 | .0051 | 10 | .0100 | 12 | .0149 | 8 | 2.24 | 4,376 | .06 | .02 |
| 8 | .1404 | 4 | .1157 | 4 | .1149 | 4 | .1118 | 4 | .1343 | 4 | .1286 | 4 | .43 | 4,376 | .79 | .01 |
| 9 | .0104 | 11 | .0030 | 9 | .0123 | 8 | .0102 | 9 | .0199 | 10 | .0113 | 11 | .53 | 4,376 | .72 | .01 |
| 10 | .0207 | 5 | .0526 | 5 | .0000 | 11 | .0406 | 5 | .0498 | 6 | .0307 | 6 | 2.42 | 4,376 | .05 | .03 |
| 11 | .1829 | 3 | .1737 | 3 | .1170 | 3 | .2200 | 3 | .1940 | 3 | .1828 | 3 | 1.66 | 4,376 | .16 | .02 |
| 12 | .0156 | 7 | .0000 | 12 | .0123 | 8 | .0000 | 12 | .0211 | 8 | .0116 | 10 | 1.01 | 4,376 | .40 | .01 |

TABLE 16

Spearman's rho between countries for loss of control for percent chosen and means

| Means | Israel | UK | Canada | Korea 1 | Korea 2 |
|---|---|---|---|---|---|
| | | Percent chosen | | | |
| Israel | | .88* | .61* | .94 | .88* |
| UK | .89* | | .72* | .92* | .83* |
| Canada | .61* | .66* | | .56* | .54* |
| Korea 1 | .83* | .94* | .54* | | .91* |
| Korea 2 | .82 | .77* | .20 | .85* | |

*p < .05

TABLE 17

Top four photographs for loss of control for percent chosen and means by country

| Country | Percent chosen | Means |
|---|---|---|
| Israel | 6, 2, 11, 8 | 6, 2, 11, 8 |
| UK | 2 = 6, 11, 8 | 2, 6, 11, 8 |
| Canada | 6, 2, 8, 11 | 6, 2, 11, 8 |
| Korea 1 | 2, 6, 11, 8 | 2, 6, 11, 8 |
| Korea 2 | 2, 6, 11, 8 | 2, 6, 11, 8 |
| Across Countries | 6, 2, 11, 8 | 6, 2, 11, 8 |

TABLE 18

Percentages for photographs chosen for loss of control on all data

|  | 6 | 2 | 11 | 8 | 6 + 2 | 6 + 11 | 6 + 8 | 2 + 11 | 2 + 8 | 11 + 8 |
|---|---|---|---|---|---|---|---|---|---|---|
| Israel | 79.4 | 63.8 | 49.4 | 40.6 | 90.0 | 86.3 | 87.5 | 81.9 | 80.6 | 77.5 |
| UK | 67.4 | 67.4 | 50.0 | 34.8 | 89.1 | 78.3 | 69.6 | 82.6 | 73.9 | 65.2 |
| BC | 51.2 | 48.8 | 23.3 | 27.9 | 74.4 | 62.8 | 55.8 | 58.1 | 60.5 | 41.9 |
| Korea 1 | 75.4 | 76.9 | 66.2 | 32.3 | 90.8 | 89.2 | 93.8 | 93.8 | 90.8 | 83.1 |
| Korea 2 | 58.2 | 64.2 | 50.7 | 35.8 | 76.1 | 79.1 | 77.6 | 85.1 | 80.6 | 74.6 |

TABLE 19

Means for photographs chosen for loss of control on all data

|  | 6 | 2 | 11 | 8 | 6 + 2 | 6 + 11 | 6 + 8 | 2 + 11 | 2 + 8 | 11 + 8 |
|---|---|---|---|---|---|---|---|---|---|---|
| Israel | 0.3083 | 0.2451 | 0.1829 | 0.1404 | 0.5534 | 0.4913 | 0.4488 | 0.4281 | 0.3856 | 0.3234 |
| UK | 0.2893 | 0.3111 | 0.1737 | 0.1157 | 0.6004 | 0.4630 | 0.4050 | 0.4848 | 0.4267 | 0.2893 |
| BC | 0.2912 | 0.2835 | 0.1170 | 0.1149 | 0.5747 | 0.4081 | 0.4060 | 0.4005 | 0.3984 | 0.2319 |
| Korea 1 | 0.2540 | 0.2643 | 0.2200 | 0.1118 | 0.5183 | 0.4749 | 0.3658 | 0.4852 | 0.3762 | 0.3328 |
| Korea 2 | 0.1978 | 0.2450 | 0.0137 | 0.0211 | 0.4428 | 0.3918 | 0.3321 | 0.4391 | 0.3794 | 0.3284 |

TABLE 20

Percent chosen for each photo by country for premeditated assault (PA); Chi-square analyses for country on percent chosen for each photo

| Photo ID | Israel % for PA | Israel Ranking for PA | UK % for PA | UK Ranking for PA | BC % for PA | BC Ranking for PA | Korea 1 % for PA | Korea 1 Ranking for PA | Korea 2 % for PA | Korea 2 Ranking for PA | Across Countries % for PA | Across Countries Ranking for PA | Chi-square $\chi^2$ | df | Asymp. Sig. (2-sided) |
|---|---|---|---|---|---|---|---|---|---|---|---|---|---|---|---|
| 1 | 27.5 | 4 | 15.6 | 8 | 16.3 | 5 | 27.7 | 5 | 14.9 | 7 | 22.6 | 5 | 7.67 | 4 | .11 |
| 2 | 3.1 | 12 | 4.4 | 12 | 4.7 | 11 | 6.2 | 11 | 6.0 | 12 | 4.5 | 12 | 1.47 | 4 | .83 |
| 3 | 40.6 | 2 | 28.9 | 2 | 27.9 | 2 | 32.3 | 4 | 40.3 | 2 | 36.3 | 2 | 4.58 | 4 | .33 |
| 4 | 56.9 | 1 | 26.7 | 3 | 51.2 | 1 | 69.2 | 1 | 44.8 | 1 | 52.6 | 1 | 22.20 | 4 | .00 |
| 5 | 30.0 | 3 | 17.8 | 6 | 14.0 | 7 | 49.2 | 2 | 34.3 | 3 | 30.8 | 3 | 20.11 | 4 | .00 |
| 6 | 6.9 | 11 | 11.1 | 9 | 11.6 | 8 | 1.5 | 12 | 11.9 | 9 | 7.9 | 11 | 6.81 | 4 | .15 |
| 7 | 16.3 | 7 | 17.8 | 6 | 9.3 | 9 | 15.4 | 6 | 11.9 | 9 | 14.7 | 7 | 2.07 | 4 | .72 |
| 8 | 12.5 | 8 | 24.4 | 4 | 7.0 | 10 | 10.8 | 8 | 14.9 | 7 | 13.4 | 8 | 6.88 | 4 | .14 |
| 9 | 24.4 | 5 | 20.0 | 5 | 16.3 | 5 | 35.4 | 3 | 22.4 | 5 | 24.5 | 4 | 6.39 | 4 | .17 |
| 10 | 7.5 | 10 | 6.7 | 11 | 2.3 | 12 | 9.2 | 10 | 23.9 | 4 | 10.0 | 10 | 18.87 | 4 | .00 |
| 11 | 10.6 | 9 | 11.1 | 9 | 20.9 | 3 | 10.8 | 8 | 16.4 | 6 | 12.9 | 9 | 4.34 | 4 | .36 |
| 12 | 22.5 | 6 | 35.6 | 1 | 20.9 | 3 | 15.4 | 6 | 11.9 | 9 | 20.8 | 6 | 10.58 | 4 | .03 |

TABLE 21

Means for each photo by country for premeditated assault (PA); One-way ANOVAs for country on each photo

| Photo ID | Israel Means for LC | Israel Ranking for PA | UK Means for PA | UK Ranking for PA | BC Means for PA | BC Ranking for PA | Korea 1 Means for PA | Korea 1 Ranking for PA | Korea 2 Means for PA | Korea 2 Ranking for PA | Across Countries Means for PA | Across Countries Ranking for PA | ANOVA F | df | Sig. | $\eta_p^2$ |
|---|---|---|---|---|---|---|---|---|---|---|---|---|---|---|---|---|
| 1 | .1014 | 4 | .0533 | 9 | .0735 | 5 | .0622 | 8 | .0839 | 5 | .0839 | 5 | 1.19 | 4,375 | .32 | .01 |
| 2 | .0135 | 12 | .0258 | 11 | .0077 | 11 | .0299 | 12 | .0183 | 12 | .0183 | 12 | .52 | 4,375 | .72 | .01 |
| 3 | .1604 | 2 | .1311 | 3 | .1216 | 2 | .1443 | 2 | .1418 | 2 | .1418 | 2 | .69 | 4,375 | .60 | .01 |
| 4 | .2246 | 1 | .1589 | 2 | .3000 | 1 | .1940 | 1 | .2255 | 1 | .2255 | 1 | 2.10 | 4,375 | .08 | .02 |
| 5 | .1148 | 3 | .0813 | 5 | .0502 | 8 | .1194 | 3 | .1143 | 3 | .1143 | 3 | 3.38 | 4,375 | .01 | .04 |
| 6 | .0259 | 11 | .0664 | 8 | .0619 | 7 | .0398 | 11 | .0336 | 11 | .0336 | 11 | 2.10 | 4,375 | .08 | .02 |
| 7 | .0599 | 7 | .0793 | 6 | .0309 | 9 | .0522 | 9 | .0560 | 7 | .0560 | 7 | .64 | 4,375 | .64 | .01 |
| 8 | .0508 | 8 | .1033 | 4 | .0309 | 9 | .0647 | 7 | .0546 | 9 | .0546 | 9 | 1.70 | 4,375 | .15 | .02 |
| 9 | .0879 | 5 | .0682 | 7 | .0658 | 6 | .0945 | 4 | .0896 | 4 | .0896 | 4 | .92 | 4,375 | .45 | .01 |
| 10 | .0311 | 10 | .0240 | 12 | .0019 | 12 | .0871 | 5 | .0371 | 10 | .0371 | 10 | 4.29 | 4,375 | .00 | .04 |
| 11 | .0446 | 9 | .0498 | 10 | .1044 | 3 | .0697 | 6 | .0553 | 8 | .0553 | 8 | 1.48 | 4,375 | .21 | .02 |
| 12 | .0785 | 6 | .1607 | 1 | .1026 | 4 | .0423 | 10 | .0803 | 6 | .0803 | 6 | 3.92 | 4,375 | .00 | .04 |

TABLE 22

Spearman's rho between countries for loss of control for percent chosen and means

| | Percent chosen | | | | |
|---|---|---|---|---|---|
| Means | Israel | UK | Canada | Korea 1 | Korea 2 |
| Israel |  | .73* | .73* | .95* | .71* |
| UK | .68* |  | .65* | .64* | .35 |
| Canada | .66* | .55* |  | .65* | .49 |
| Korea 1 | .95* | .59* | .60* |  | .69* |
| Korea 2 | .75* | .34* | .46 | .76* |  |

*p < .05

TABLE 23

Top four photographs for loss of control for percent chosen and means by country

| Country | Percent chosen | Means |
|---|---|---|
| Israel | 4, 3, 5, 1 | 4, 3, 5, 1 |
| UK | 12, 3, 4, 8 | 12, 4, 3, 8 |
| Canada | 4, 3, 11 = 12 | 4, 3, 11, 12 |
| Korea 1 | 4, 5, 9, 3 | 4, 5, 9, 3 |
| Korea 2 | 4, 3, 5, 10 | 4, 3, 5, 9 |
| Across Countries | 4, 3, 5, 9 | 4, 3, 5, 9 |

TABLE 24

Percentages for photographs chosen for premeditated assault on all data

| | 4 | 3 | 5 | 9 | 4 + 3 | 4 + 5 | 4 + 9 | 3 + 5 | 3 + 9 | 5 + 9 |
|---|---|---|---|---|---|---|---|---|---|---|
| Israel | 56.9 | 40.6 | 30.0 | 24.4 | 78.1 | 70.0 | 68.8 | 58.1 | 56.9 | 47.5 |
| UK | 26.7 | 28.9 | 17.8 | 20.0 | 51.1 | 42.2 | 40.0 | 37.8 | 40.0 | 26.7 |
| BC | 51.2 | 27.9 | 14.0 | 16.3 | 62.8 | 58.1 | 58.1 | 32.6 | 37.2 | 23.3 |
| Korea 1 | 69.2 | 32.3 | 49.2 | 35.4 | 89.2 | 87.7 | 80.0 | 60.0 | 58.5 | 61.5 |
| Korea 2 | 52.6 | 36.3 | 30.8 | 24.5 | 79.1 | 67.2 | 55.2 | 53.7 | 53.7 | 47.8 |

TABLE 25

Means for photographs chosen for premeditated assault on all data

| | 4 | 3 | 5 | 9 | 4 + 3 | 4 + 5 | 4 + 9 | 3 + 5 | 3 + 9 | 5 + 9 |
|---|---|---|---|---|---|---|---|---|---|---|
| Israel | 0.2246 | 0.1604 | 0.1148 | 0.0879 | 0.3849 | 0.3394 | 0.3124 | 0.2752 | 0.2482 | 0.2027 |
| UK | 0.1589 | 0.1311 | 0.0813 | 0.0682 | 0.2900 | 0.2402 | 0.2271 | 0.2124 | 0.1993 | 0.1496 |
| BC | 0.3000 | 0.1216 | 0.0502 | 0.0658 | 0.4216 | 0.3502 | 0.3658 | 0.1719 | 0.1874 | 0.1160 |
| Korea 1 | 0.2569 | 0.1145 | 0.1729 | 0.1194 | 0.3714 | 0.4298 | 0.3763 | 0.2874 | 0.2338 | 0.2923 |
| Korea 2 | 0.1940 | 0.1443 | 0.1194 | 0.0945 | 0.3383 | 0.3134 | 0.2886 | 0.2637 | 0.2388 | 0.2139 |

Example 3

3.0 FACS Coding for DIWS

Table 26 itemizes the Facial Action Coding System (FACS) which indicates a procedure to analyze human face expressions. This system may be used to analyze and evaluate expressions in cooperation with embodiments of the present invention. Different evaluators may use different codes as indicated below.

TABLE 26

| Expression | FACS AU | Muscle name | Intensity level |
|---|---|---|---|
| Premeditated Assault | 4 | Corrugator supercilii, Depressor supercilii | A-C |
|  | 5 | Levator palpebrae superioris | A-C |
|  | 7 | Orbicularis oculi, pars palpebralis | A-B |
|  | 23 | Orbicularis oris | Top and/or bottom; A-C; may or may not be present |
|  | 17 | Mentalis | May or may not be present |
| Loss of Control, version 1 | 4 | Corrugator supercilii, Depressor supercilii | C-E |
|  | 5 | Levator palpebrae superioris | C-E |

TABLE 26-continued

| Expression | FACS AU | Muscle name | Intensity level |
|---|---|---|---|
| | 7 | Orbicularis oculi, pars palpebralis | A-B: may or may not be present |
| | 23 | Orbicularis oris | Top and/or bottom; A-D |
| | 26 | Jaw drop | |
| | Face reddening | | |
| Loss of Control, version 2 | 4 | Corrugator supercilii, Depressor supercilii | D-E |
| | 5 | Levator palpebrae superioris | C-E |
| | 7 | Orbicularis oculi, pars palpebralis | C-E |
| | 9 | Levator labii superioris alaquae nasi | C-E |
| | 20 | Risorius w/ platysma | C-E |
| | Face reddening | | |
| | Jaw clench | | |
| | 10 | Levator labii superioris | May or may not be present |
| | 16 | Depressor labii inferioris | May or may not be present |
| | 23 | Orbicidaris oris | May or may not be present |
| | 21 | | May or may not be present |

Paul's Codes:
Premeditated: 4a/c+5a/c with or without 23t/b a/c, with or without 17,
Loss of Control 6: 4c/e+5c/e+23t/b a/d+25+face red
Loss of Control 2 4d/e+5c/e+7c/e+9c/e+20c/e+face red+jaw clenched with or without: 10, 23, 21
David and Hyi-Sung's Codes:
Premeditated 4A/B+5A/B+7A/B+23A/C (with/without 17)
Loss of Control 2: 4C/E+5C/E+7C/E+9C/E+10C/E+20C/E+23C/E+(BITE)+(with/without 16)+face color
Loss of Control 11: 4C/E+5C/E+7C/E+23C/E+NO17 (with/without 9)
Loss of Control 6: 4A/B+5E+7C/E+23C/E+26+face color Thus, specific embodiments, methods and systems for identifying intent through facial expressions have been disclosed. It should be apparent, however, to those skilled in the art that many more modifications besides those already described are possible without departing from the inventive concepts herein. The inventive subject matter, therefore, is not to be restricted except in the spirit of the disclosure herein. Moreover, in interpreting the specification and claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

We claim:

1. A method of creating and analyzing a plurality of facial expressions, comprising:
   identifying a subject person,
   utilizing the subject person to create an image of a known target,
   removing at least one distracter expression from the target image to form a revised target image,
   reviewing the revised target image with at least one third party participant to form a final target image;
   presenting, by a computer, a user with multiple target images depicting a facial expression, wherein the multiple target images include images of dangerous intent and images of non-dangerous intent, and wherein the multiple target images include the final target image;
   receiving, by the computer, a response from the user, wherein the response indicates whether or not the facial expression depicted in each target image of the multiple target images depicts a dangerous intent facial expression;
   determining, by the computer, whether the response is correct or incorrect;
   tracking, by the computer, a total number of correct and incorrect responses from the user; and
   displaying, by the computer, the total number of correct and incorrect responses to the user.

2. The method of claim 1, wherein the subject person is a crime victim.

3. The method of claim 2, wherein the crime victim is an assault victim.

4. The method of claim 1, wherein the known target is the criminal.

5. The method of claim 4, wherein the criminal is an attacker.

6. The method of claim 1, further comprising identifying at least one key feature in the final target image that depicts target intent.

7. The method of claim 6, wherein the target intent comprises dangerous intent.

8. The method of claim 1, further comprising comparing the final target image to at least one comparison image.

9. The method of claim 1, wherein utilizing the subject person to create an image of a known target includes digitizing the image.

10. A method of creating and analyzing a plurality of facial expressions, comprising:
    identifying a subject person,
    utilizing the subject person to create a target image of a known target,
    digitizing the target image,
    removing at least one distracter expression from the target image to transform the target image to a revised target image,
    reviewing the revised target image with at least one third party participant to transform the revised target image to a final target image;

presenting, by the computer, a user with multiple target images depicting a facial expression, wherein the multiple target images include images of dangerous intent and images of non-dangerous intent, and wherein the multiple target images include the final target image;

receiving, by the computer, a response from the user, wherein the response indicates whether or not the facial expression depicted in each target image of the multiple target images depicts a dangerous intent facial expression;

determining, by the computer, whether the response is correct or incorrect;

tracking, by the computer, a total number of correct and incorrect responses from the user; and displaying, by the computer, the total number of correct and incorrect responses to the user.

11. The method of claim 10, wherein the subject person is a crime victim.

12. The method of claim 11, wherein the crime victim is an assault victim.

13. The method of claim 10, wherein the known target is the criminal.

14. The method of claim 13, wherein the criminal is an attacker.

15. The method of claim 10, further comprising identifying at least one key feature in the final target image that depicts target intent.

16. The method of claim 15, wherein the target intent comprises dangerous intent.

17. The method of claim 10, further comprising comparing the final target image to at least one comparison image.

18. The method of claim 10, wherein utilizing the subject person to create an image of a known target includes digitizing the image.

19. An executable software for implementing the method of one of claim 1 or 10, embodied on a non-transitory computer-readable medium, the executable software comprising:
a set speed function, a pre-test phase function, an instruction phase function, a practice phase function, and
a post-test phase function.

20. A system comprising a computer for executing the executable software of claim 11.

21. A method of analyzing a plurality of facial expressions, comprising:
presenting, by a computer, a user with multiple target images depicting a facial expression, wherein the multiple target images include images of dangerous intent and images of non-dangerous intent;

receiving, by the computer, a response from the user, wherein the response indicates whether or not the facial expression displayed in each target image of the multiple target images depicts a dangerous intent facial expression;

determining, by the computer, whether the response is correct or incorrect;

tracking, by the computer, a total number of correct and incorrect responses from the user; and displaying, by the computer, the total number of correct and incorrect responses to the user.

22. The method of claim 21, further comprising:
providing the user with instructions for identifying dangerous intent facial expressions, wherein the instructions comprise a depiction of dangerous intent facial expressions, and wherein the instructions contrast the dangerous intent facial expression depictions with a depiction of distracter facial expressions.

* * * * *